US011744182B2

(12) United States Patent
Carlson et al.

(10) Patent No.: US 11,744,182 B2
(45) Date of Patent: Sep. 5, 2023

(54) CROP YIELD DETERMINING APPARATUS

(71) Applicants: Deere & Company, Moline, IL (US); Iowa State University Research Foundation, Inc., Ames, IA (US)

(72) Inventors: Brandon C. Carlson, Ankeny, IA (US); Jeffrey S. Wigdahl, Ames, IA (US); Nicholas W. Vanlaningham, Bondurant, IA (US); Kurt D. Gustafson, Altoona, IA (US); Jeffrey C. Askey, Boone, IA (US)

(73) Assignees: Deere & Company, Moline, IL (US); Iowa State University Research Foundation, Ames, IA (US)

( * ) Notice: Subject to any disclaimer, the term of this patent is extended or adjusted under 35 U.S.C. 154(b) by 43 days.

(21) Appl. No.: 17/338,957

(22) Filed: Jun. 4, 2021

(65) Prior Publication Data

US 2022/0386531 A1    Dec. 8, 2022

(51) Int. Cl.
*A01D 46/08*    (2006.01)
*A01D 41/127*    (2006.01)
*A01F 15/07*    (2006.01)

(52) U.S. Cl.
CPC ....... *A01D 46/085* (2013.01); *A01D 41/1271* (2013.01); *A01D 41/1272* (2013.01); *A01F 15/07* (2013.01)

(58) Field of Classification Search
CPC .............. A01D 46/085; A01D 41/1271; A01D 41/1272; A01F 15/07
See application file for complete search history.

(56) References Cited

U.S. PATENT DOCUMENTS

| | | | | |
|---|---|---|---|---|
| 4,068,223 A | * | 1/1978 | Steffen | A01D 46/085 340/684 |
| 4,961,304 A | * | 10/1990 | Ovsborn | A01D 46/085 340/684 |
| 5,920,018 A | * | 7/1999 | Wilkerson | G01F 1/74 73/861.41 |
| 6,809,821 B2 | | 10/2004 | Thomasson et al. | |
| 6,820,459 B2 | | 11/2004 | Beck et al. | |
| 7,073,314 B2 | | 7/2006 | Beck et al. | |
| 7,257,503 B1 | * | 8/2007 | Anderson | A01D 41/1277 56/10.2 H |
| 7,650,734 B2 | | 1/2010 | Beck et al. | |

(Continued)

*Primary Examiner* — Thomas B Will
*Assistant Examiner* — Julia C Tran
(74) *Attorney, Agent, or Firm* — TUCKER ELLIS LLP

(57) ABSTRACT

A cotton harvester estimates the mass of cotton as it is harvested using sensor devices and compares the mass of each module against the estimated mass of the module as determined by the sensors so that a calibration factor may be determined and actively updated for more accurate crop yield determination. The mass flow for a specific module is accumulated and processed during harvesting using a base calibration factor and the module is weighed and compared against the expected mass using the base calibration factor to develop a candidate updated calibration factor. The base calibration factor is selectively replaced by the candidate updated calibration factor for processing a subsequent module based on machine feedback information relating to the operation of the harvester. Harvested crop data determined using the calibration factor is used to generate highly accurate yield maps.

18 Claims, 11 Drawing Sheets

(56) References Cited

U.S. PATENT DOCUMENTS

| | | | |
|---|---|---|---|
| 9,645,006 B2* | 5/2017 | Phelan | G01F 25/10 |
| 9,681,605 B2 | 6/2017 | Noonan et al. | |
| 9,702,753 B2 | 7/2017 | Johnson et al. | |
| 9,894,836 B2 | 2/2018 | Garton | |
| 9,903,979 B2 | 2/2018 | Dybro et al. | |
| 10,295,703 B2 | 5/2019 | Dybro et al. | |
| 10,408,645 B2 | 9/2019 | Blank et al. | |
| 10,462,971 B2 | 11/2019 | Wallestad et al. | |
| 10,477,775 B2 | 11/2019 | Lang et al. | |
| 2004/0050138 A1* | 3/2004 | Beck | A01D 41/1271 |
| | | | 73/1.16 |
| 2009/0325658 A1* | 12/2009 | Phelan | G01F 13/005 |
| | | | 460/6 |
| 2013/0080079 A1* | 3/2013 | Dankowicz | G01F 1/76 |
| | | | 73/861.73 |
| 2013/0317696 A1* | 11/2013 | Koch | A01D 41/1272 |
| | | | 701/33.9 |
| 2014/0230580 A1* | 8/2014 | Dybro | G01L 1/00 |
| | | | 56/103 |
| 2014/0358466 A1* | 12/2014 | Foster | A01D 46/084 |
| | | | 702/101 |
| 2016/0165803 A1* | 6/2016 | Smith | G05B 15/02 |
| | | | 700/275 |
| 2017/0112060 A1* | 4/2017 | Noonan | A01D 46/085 |
| 2017/0202143 A1* | 7/2017 | Garton | A01D 41/1273 |
| 2018/0120133 A1* | 5/2018 | Blank | G01D 18/002 |
| 2021/0015043 A1 | 1/2021 | Carlson et al. | |
| 2021/0092900 A1* | 4/2021 | Cartier | G05B 19/4155 |

\* cited by examiner

CROP YIELD DETERMINING APPARATUS

FIELD OF THE DISCLOSURE

The present disclosure generally relates to crop harvesting and, more particularly, to apparatus and methods providing yield result information for estimating, monitoring, reporting, and managing crop production.

BACKGROUND

Some harvesters sense a yield of a crop being harvested across a width of a harvesting head. The data that is obtained assists in determining crop production, and it may also be used to assist with the control of selected functional systems of the harvester. Unfortunately, the data collection is often inaccurate, particularly when it is processed without regard for the state or condition of the crop as it is processed by various sub-systems of the harvesting machine. Inaccuracy may also result when the data is aggregated across the width of the harvesting head by plural sensors that are not identically matched or precisely calibrated or that have intrinsic characteristics that may change over time or during use.

SUMMARY

The implementations herein provide a crop yield determining apparatus and to methods determining crop yield.

The implementations herein further provide a crop yield determining methods and apparatus that calibrate based on the crop as it is harvested.

The implementations herein further provide a crop yield determining methods and apparatus that automatically calibrate based on the crop as it is harvested.

The implementations herein further provide a crop yield determining methods and apparatus that calibrate automatically and continuously based on the crop as it is harvested.

The implementations herein further provide a crop yield determining methods and apparatus that self-calibrate automatically and continuously based on the crop as it is harvested.

The implementations herein further provide a cotton harvester determining a crop yield as the crop is harvested.

The implementations herein further provide a crop yield determining apparatus in a cotton harvester that calibrates based on the crop as it is harvested.

The implementations herein further provide a crop yield determining apparatus in a cotton harvester that automatically calibrates based on the crop as it is harvested.

The implementations herein further provide a crop yield determining apparatus in a cotton harvester that automatically and continuously calibrates based on the crop as it is harvested.

The implementations herein further provide a crop yield determining apparatus in a cotton harvester that automatically and continuously self-calibrates based on the crop as it is harvested.

In one aspect, a cotton harvester is provided including a chassis supported for movement relative to ground beneath the cotton harvester by ground engaging members operatively coupled with the chassis, a cotton harvesting head operatively coupled with the chassis, a crop receptacle operatively coupled with the chassis, an air duct system comprising a plurality of separate air ducts, and an apparatus for determining a yield of the cotton harvested. The cotton harvesting head includes a plurality of cotton picking row units operable to harvest cotton from plants entering into the cotton harvesting head as the cotton harvester is moved forward relative to the ground by the ground engaging members. The crop receptacle includes a module builder configured to form the harvested cotton into a cotton module. Each of the separate air ducts of the air duct system is associated with one of the cotton picking row units for communicating the cotton harvested from the cotton picking row units to the crop receptacle. The apparatus of the cotton harvester for determining the yield of the cotton harvested includes a harvesting sensor operative to generate a production signal representative of a production rate of the cotton being harvested, an accumulated crop sensor operative to generate a bulk crop signal representative of a measured parameter of the cotton harvested during a selected time period, and a crop sensing control system. The crop sensing control system includes a processor, a memory device operably coupled with the processor, operational data stored in the memory device and representative of an operational characteristic of the cotton harvester, base calibration factor data stored in the memory device and representative of a base calibration factor, and control logic stored in the memory device and executable by the processor to determine the yield of the cotton harvested. The control logic is executable by the processor to receive the production and bulk crop signals, determine in response to applying the base calibration factor to the production signal an estimated mass of the cotton harvested during a first time period, determine in response to the bulk crop signal a measured mass of the cotton harvested during the first time period, determine an updated calibration factor candidate in response to a ratio between the estimated mass and the measured mass, and determine a yield of the cotton harvested during a second time period after the first time period by selectively applying, in response to the operational data, one of either the base calibration factor or the updated calibration factor candidate to the production signal generated by the harvesting sensor during the second time period representative of the production rate of the cotton harvested during the second time period.

A method is provided in accordance with a further aspect for determining crop yield during harvesting of the crop. Operational data is stored in a memory device of a crop sensing control system comprising a processor and the memory device operably coupled with the processor, wherein the operational data comprises harvester data representative of an operational characteristic of an associated harvester harvesting the crop. Base calibration factor data representative of a base calibration factor and control logic are stored in the memory device. A production signal representative of a production rate of the crop being harvested is generated by a harvesting sensor operably coupled with the crop sensing control system. A bulk crop signal representative of a measured parameter of the crop harvested during a selected time period is generated by an accumulated crop sensor operably coupled with the crop sensing control system. The control logic is executed by the processor to determine in response to applying the base calibration factor to the production signal an estimated mass of the crop harvested during a first time period, and to determine in response to the bulk crop signal a measured mass of the crop harvested during the first time period, and to determine an updated calibration factor candidate in response to a ratio between the estimated mass and the measured mass, and to determine the crop yield during a second time period after the first time period by selectively applying, in response to the operational data, one of either the base calibration factor or the updated calibration factor candidate to the production signal generated by the harvesting sensor (320) during the second time period representative of the production rate of the crop harvested during the second time period.

In a further aspect, a crop sensing apparatus includes a crop sensing control system, a harvesting sensor operably coupled with the crop sensing control system, and an accumulated crop sensor operably coupled with the crop sensing control system. The crop sensing control system includes a processor, a memory device operably coupled with the processor, operational data stored in the memory device, base calibration factor data stored in the memory device, and control logic. The operational data includes harvester data representative of an operational characteristic of an associated harvester harvesting the crop, and the base calibration data is representative of a base calibration factor. The control logic is executable by the processor to determine the crop yield. The harvesting sensor is operative to generate a production signal representative of a production rate of the crop harvested during a selected time period, and the accumulated crop sensor is operative to generate a bulk crop signal representative of a measured parameter of the crop harvested during the selected time period. The control logic is executable by the processor to determine based on the production signal an estimated mass of the crop harvested during a first time period, and to determine based on the bulk crop signal a measured mass of the crop harvested during the first time period. The control logic is further executable by the processor to determine an updated calibration factor candidate based on a ratio between the estimated mass and the measured mass. The control logic is further executable by the processor to determine the crop yield during a second time period after the first period by selectively applying based on the operational data one of either the base calibration factor or the updated calibration factor candidate to the production signal generated by the harvesting sensor system during the second time period representative of the production rate of the crop harvested during the second time period.

In accordance with a further aspect, a non-transitory computer-readable storage medium is provided storing a set of control logic instructions for determining crop yield during harvesting of the crop. The control logic instructions, when executed by one or more processors, causing a crop sensing control system comprising a processor and a memory device operably coupled with the processor to perform steps comprising storing operational data in the memory device of the crop sensing control system, the operational data comprising harvester data representative of an operational characteristic of an associated harvester harvesting the crop; storing base calibration factor data in the memory device the base calibration data being representative of a base calibration factor; storing control logic in the memory device, wherein the control logic is executable by the processor to determine the crop yield; generating by a harvesting sensor operably coupled with the crop sensing control system a production signal representative of a production rate of the crop being harvested; generating by an accumulated crop sensor operably coupled with the crop sensing control system a bulk crop signal representative of a measured parameter of the crop harvested during a selected time period; determining in response to applying the base calibration factor to the production signal an estimated mass of the crop harvested during a first time period; determining in response to the bulk crop signal a measured mass of the crop harvested during the first time period; determining an updated calibration factor candidate in response to a ratio between the estimated mass and the measured mass; and determining the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period.

In accordance with a further aspect, a non-transient computer readable storage medium is provided storing control logic that is executable by a computer for performing a method of determining crop yield during harvesting of the crop. In the example, the method performed by the logic stored in the non-transient computer readable storage medium and executed by the computer comprises storing operational data in a memory device of a crop sensing control system comprising a processor and the memory device operably coupled with the processor, the operational data comprising harvester data representative of an operational characteristic of an associated harvester harvesting the crop; storing base calibration factor data in the memory device, the base calibration data being representative of a base calibration factor; storing control logic in the memory device, wherein the control logic is executable by the processor to determine the crop yield; generating by a harvesting sensor operably coupled with the crop sensing control system a production signal representative of a production rate of the crop being harvested; generating by an accumulated crop sensor operably coupled with the crop sensing control system a bulk crop signal representative of a measured parameter of the crop harvested during a selected time period; and executing the control logic by the processor to: determine in response to applying the base calibration factor to the production signal an estimated mass of the crop harvested during a first time period; determine in response to the bulk crop signal a measured mass of the crop harvested during the first time period; determine an updated calibration factor candidate in response to a ratio between the estimated mass and the measured mass; and determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period.

In accordance with a further aspect, the method performed by the logic stored in the non-transient computer readable storage medium and executed by the computer further comprises generating the production signal representative of the production rate of the crop being harvested by generating by a module mass feedback device a bulk crop module mass signal representative of a measured mass of the crop harvested during the first time period and bundled into a crop module; executing the control logic by the processor to determine in response to the bulk crop module mass signal a bulk crop module mass of the crop harvested during the first time period; storing in the memory device crop bundle required mass data representative of a required mass range of the crop module; and executing calibration management logic by the processor to determine the crop yield during the second time period by: applying the updated calibration factor candidate to the production signal generated by the harvesting sensor during the second time period in response to the determined bulk crop module mass of the crop harvested during the first time period being within the required mass range of the crop module, or applying the base calibration factor to the production signal generated by the harvesting sensor during the second time period in response to the determined bulk crop module mass of the crop harvested during the first time period being not within the required mass range of the crop module.

In accordance with a further aspect, the method performed by the logic stored in the non-transient computer readable storage medium and executed by the computer further comprises generating by a module diameter feedback device a crop module diameter signal representative of a measured diameter of a crop module a formed by the associated harvester using the crop harvested during the first time period and bundled into the crop module; executing the control logic by the processor to determine in response to the crop module diameter signal a crop module diameter of the crop module; storing in the memory device crop bundle required diameter data representative of a minimum required diameter of the crop module; and executing calibration management logic by the processor to determine the crop yield during the second time period by: applying the updated calibration factor candidate to the production signal generated by the harvesting sensor during the second time period in response to the determined crop module diameter being greater than the minimum required diameter, or applying the base calibration factor to the production signal generated by the harvesting sensor during the second time period in response to the determined crop module diameter being less than the minimum required diameter.

In accordance with a further aspect, the method performed by the logic stored in the non-transient computer readable storage medium and executed by the computer further comprises generating by an accumulator level feedback device an accumulator level signal representative of a measured level of the crop harvested during the first time period and received in an accumulator of the associated harvester; executing the control logic by the processor to determine in response to the accumulator level signal a crop fill level of the of the crop harvested during the first time period and received in the accumulator of the associated harvester; storing in the memory device accumulator required crop fill level data representative of a minimum required pile height of the crop harvested during the first time period and stacked in the accumulator of the associated harvester; and executing calibration management logic by the processor to determine the crop yield during the second time period by: applying the updated calibration factor candidate to the mass signal representative of the measured quantity the crop harvested during the second time period in response to the determined crop fill level of the crop harvested during the first time period and received in the accumulator of the associated harvester being greater than the minimum required pile height, or applying the base calibration factor to the mass signal representative of the measured quantity the crop harvested during the second time period in response to the determined crop fill level of the crop harvested during the first time period and received in the accumulator of the associated harvester being less than the minimum required pile height.

In accordance with a further aspect, the method performed by the logic stored in the non-transient computer readable storage medium and executed by the computer further comprises storing ratio range data representative of a required ratio range of the ratio between the estimated mass of the crop harvested during the first time period and the measured mass of the crop harvested during the first time period; and executing calibration management logic by the processor to determine the crop yield during the second time period by: applying the updated calibration factor candidate to the mass signal representative of the measured quantity the crop harvested during the second time period in response to the ratio between the estimated mass of the crop harvested during the first time period and the measured mass of the crop harvested during the first time period being within the required ratio range, or applying the base calibration factor to the mass signal representative of the measured quantity the crop harvested during the second time period in response to the ratio between the estimated mass of the crop harvested during the first time period and the measured mass of the crop harvested during the first time period being not within the required ratio range.

In accordance with a further aspect, the method performed by the logic stored in the non-transient computer readable storage medium and executed by the computer further comprises storing a plurality of historical ratios between the estimated mass and the measured mass determined during a plurality of time periods prior to the first time period; storing statistical control logic executable by the processor to determine a ratio standard deviation value based on the stored plurality of historical ratios between the estimated mass and the measured mass determined during the plurality of time periods prior to the first time period; and executing the statistical control logic by the processor to determine the required ratio range based on the determined ratio standard deviation value.

In accordance with a further aspect, the method performed by the logic stored in the non-transient computer readable storage medium and executed by the computer further comprises generating the production signal using a plurality of mass flow sensors operatively coupled with a plurality of separate air ducts of the associated harvester, wherein each of the mass flow sensors is operable to generate a cotton mass flow rate signal representative of a mass flow rate of cotton harvested and flowing through a respective one of the separate air ducts of the associated harvester; and executing the control logic by the processor to normalize the cotton mass flow rate signals generated by the plurality of mass flow sensors as normalized cotton mass flow rate signals, and to sum the normalized cotton mass flow rate signals as the production signal representative of the production rate of the cotton being harvested.

Other features and aspects will become apparent by consideration of the detailed description and accompanying drawings.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
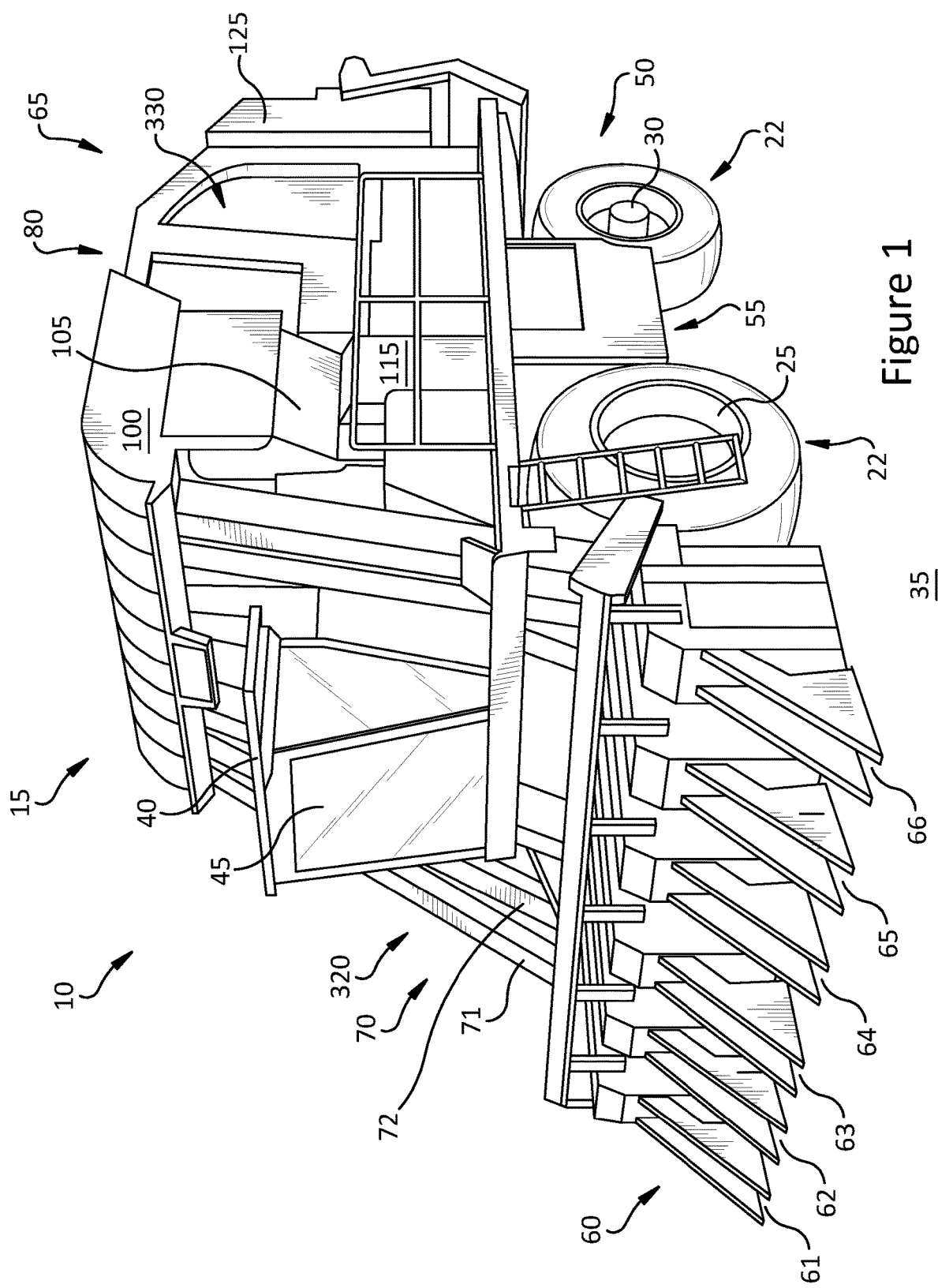
FIG. 1 is a perspective view of a cotton harvester.
Figure 2:
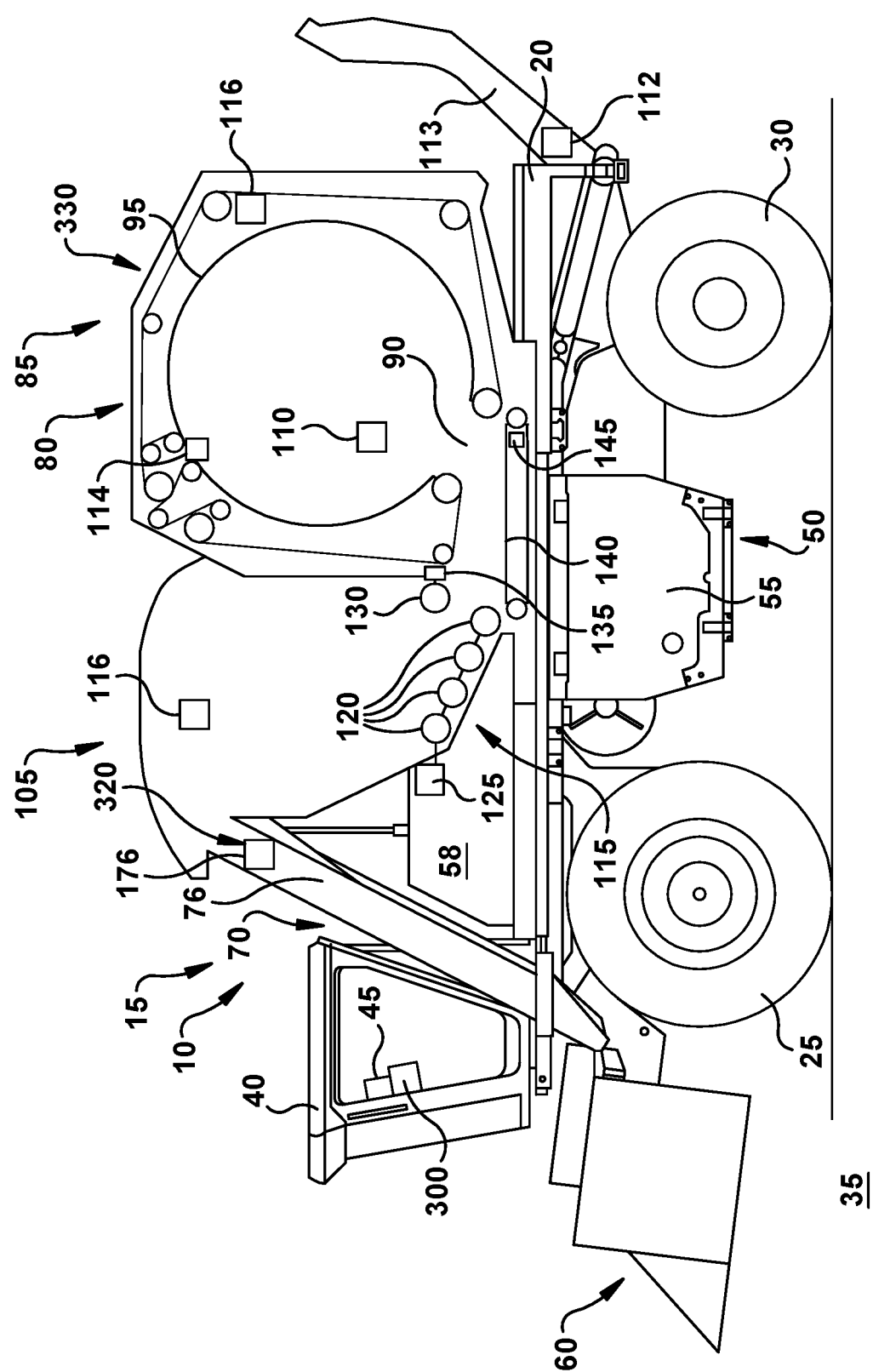
FIG. 2 is a side view of the harvester of FIG. 1.

FIGS. 1 and 2 illustrate a harvester 10 suitable for harvesting crops such as cotton, for example. The illustrated harvester 10 is a cotton harvester 15. Harvester 10 comprises a machine to harvest crops. In one implementation such as for example the implementation shown, the harvester 10 is self-propelled. In another implementation, harvester 10 is towed. Harvester 10 removes portions of plants (the crop) from the growing medium or field. In one implementation, harvester 10 comprises a holding tank in which the crop is held. In another implementation, harvester 10 routes the removed crop into a temporary holding tank of the harvester after forming the crop into a desired shape such as into a cotton module or the like for subsequent handling, wherein the gathered or otherwise formed crop may be subsequently discharged onto the ground for post-harvesting collection. In yet another implementation, harvester 10 discharges the removed crop into a holding tank of another vehicle whereat it may be formed, weighed, and then discharged onto the ground for subsequent collection. It is to be appreciated that types of harvesters 10 other than the cotton harvester 15 of the example implementation are contemplated by this disclosure (e.g., cotton strippers, combines, etc.) as well.

The cotton harvester 15 of the example implementation includes a chassis 20. The illustrated chassis 20 is supported by ground engaging members 22 such as front wheels 25 and rear wheels 30 although other support is contemplated (e.g., tracks). The cotton harvester 15 is adapted for movement through a field 35 to harvest crops (e.g., cotton, corn, stover, hay, alfalfa, etc.). An operator station 40 is supported by the chassis 20. An operator interface 45 is positioned in the operator station 40. A power module 50 may be supported below the chassis 20. The power module 50 may be an engine 55. Water, lubricant, and fuel tanks, indicated generally at 58 (FIG. 2), may be supported on the chassis 20.

A harvesting structure 60 is mutually coupleable with the chassis 20. The illustrated harvesting structure 60 is configured to remove crops from the field 35. The harvesting structure 60 may be a cotton harvesting structure such as shown for use in a cotton harvester 15, and may include one or more cotton picking row units 61-66, a stripper header, or any other harvesting structure (e.g., corn head). Alternatively, the harvesting structure 60 may be configured to remove corn, stover, hay, alfalfa, or any other crop.

The harvesting structure 60 is mutually coupleable with an air duct system 70 at the lead end of the cotton harvester 15 in the illustrated implementation, wherein the air duct system 70 is configured to draw crop processed by the harvesting structure 60 into the cotton harvester 15. In addition, a crop receptacle 80 is mutually coupleable with the air duct system 70 for receiving crop outputted from the air duct system 70. The air duct system 70 includes a plurality of separate air ducts 71-76 (only one is shown in the view of FIG. 2), wherein each of the separate air ducts 71-76 is associated with one of the cotton picking row units 61-66 for communicating harvested cotton crop from the cotton picking row units 61-66 to the crop receptacle 80. With reference to FIG. 2, the illustrated crop receptacle 80 is a module builder 85 having a throat 90 and at least one baler belt 95. The module builder 85 forms the harvested cotton crop into round bales or "modules." Referring to FIG. 1, a cleaner 100 is provided that cleans the cotton by removing trash and debris. The cleaner 100 is typically used in a cotton stripper harvester for cleaning the cotton harvested from a cotton stripper header by removing trash and debris. A pre-chamber such as for example an accumulator 105 is provided between the air duct system 70 and the crop receptacle 80. The accumulator 105 is configured to receive cotton, or other crop, harvested by the cotton picking row units 61-66 as an intermediary step between handling by the air duct system 70 and the module builder 85 of the crop receptacle 80.

The cotton harvester 15 of the example implementation includes a harvesting sensor 320 disposed in general at or in the harvesting structure 60 and/or the an air duct system 70, and an accumulated crop sensor 330 disposed in general at or in the accumulator 105 and/or the crop receptacle 80. The harvesting sensor 320 is operative to generate a production signal representative of a production rate of the crop being harvested. The accumulated crop sensor 330 is operative to generate a bulk crop signal representative of a measured parameter of the crop harvested during selected time periods. In an example implementation, an apparatus 300 (FIG. 3) is provided for use with or in combination with a cotton harvester 15 for determining crop yield result information during harvesting of the crop, wherein the yield result information is useful for estimating, monitoring, reporting, and managing crop production, and it may also be used to assist with the control of selected functional systems of the harvester. The apparatus 300 is calibrated in response to the signals generated by the harvesting and accumulated crop sensors 320, 330 as will be described in greater detail below for providing highly accurate crop harvest production results, wherein the calibration may be automatic, and further wherein the calibration may be automatic and continuous.

With reference to FIG. 2, a moisture feedback device 110 is disposed in the crop receptacle 80. In the example implementation, the moisture feedback device 110 is operative to generate or otherwise provide a moisture level signal that is indicative of the moisture content of the crop contained in the crop receptacle 80. The moisture feedback device 110 may be a moisture sensor device configured to generate an electrical signal having a magnitude indicative of the moisture content of the crop. The moisture feedback device 110 also may be a moisture sensor device capable of wired and/or wireless operative communication with a network of the cotton harvester such as for example a Controller Area Network (CAN), and configured to generate data that is recognized by other devices on the network as being representative of the moisture content of the crop. It is to be appreciated that although the moisture feedback device 110 of the example implementation is shown as being a single device disposed at the crop receptacle 80, the moisture feedback device 110 may be positioned anywhere on the cotton harvester 15 that it may be desirable to determine the moisture of the cotton crop as it is harvested and processed, and further that several moisture feedback devices may be provided at different locations on the cotton harvester 15 as deemed necessary or desirable to determine the moisture of the cotton crop as it is harvested and processed at the different locations on the cotton harvester 15.

In addition, a module mass feedback device 112 may be coupled with a module handler portion of the crop receptacle 80. In the example implementation, the module mass feedback device 112 may be any device that can generate a signal representative of the mass of each crop bundle after it is harvested such as for example a weight sensor, a torsional sensor, a spring gauge or any similar and/or equivalent device. In the example the module mass feedback device 112 is operative to generate or otherwise provide a bulk crop module mass signal indicative or otherwise representative of the mass of each cotton module after it is completed or otherwise built-up by the module builder 85. The module mass feedback device 112 may be a mass sensor device for example that is configured to generate an electrical signal having a magnitude indicative of the mass of the harvested cotton crop after it is bundled into a selected form such as for example a cotton module form. The module may be weighed as it is ejected via a module handler arm 113 from the module builder 85 of the cotton harvester 15. The module mass feedback device 112 also may be a mass sensor device capable of wired and/or wireless operative communication with a network of the cotton harvester such as for example a CAN, and configured to generate data that is recognized by other devices on the network as being representative of the mass of the bundled crop such as the mass of the cotton module. The module mass feedback device 112 may be operatively coupled with one or more mechanisms disposed between the crop receptacle 80 and the chassis 20 of the cotton harvester 15 for example, or anywhere else that may be suitable for measuring the mass of the bundled crop.

In further addition, a module diameter feedback device 114 may also be coupled with the cotton harvester 15 in the crop receptacle 80 area. In the example implementation, the module diameter feedback device 114 is coupled with a rockshaft (not shown) that is movable with the module builder 85 and in that way is operative to generate or otherwise provide a crop module diameter signal representative of a measured diameter of the crop harvested and processed into the desired bundle or other shape suitable for ease of handling such as for example a cotton module form. The module diameter feedback device 114 may be a sensor device capable of generating a signal having a magnitude indicative of the diameter of the crop after it is bundled into a selected form such as for example in the cotton module form. The module diameter feedback device 114 also may be a sensor device capable of wired and/or wireless operative communication with a network of the cotton harvester such as for example a CAN, and configured to generate data onto the network that is recognized by other devices on the network as being representative of the diameter of the bundled crop such as the diameter of the cotton module. The module diameter feedback device 114 may be operatively coupled with one or more mechanisms disposed between the crop receptacle 80 and the chassis 20 of the cotton harvester 15 for example, or anywhere else that may be suitable for measuring the diameter of the bundled crop.

In still further addition, an accumulator level feedback device 116 may also be coupled with the crop receptacle 80. In the example implementation, the accumulator level feedback device 116 is operative to generate or otherwise provide an accumulator level signal representative of a measured level of harvested crop fill of the accumulator 105 of the cotton harvester 15. The accumulator level feedback device 116 may be a sensor device capable of generating a signal having a magnitude indicative of the fill level of the accumulator 105. The accumulator level feedback device 116 also may be a sensor device capable of wired and/or wireless operative communication with a network of the cotton harvester such as for example a CAN, and configured to generate data onto the network that is recognized by other devices on the network as being representative of the level of harvested crops filling the accumulator 105. The accumulator level feedback device 116 may be operatively coupled with one or more mechanisms disposed between the accumulator 105 and the chassis 20 of the cotton harvester 15 for example, or anywhere else that may be suitable for measuring the level of harvested crops filling the accumulator 105.

In further addition, a plurality of crop sensor devices 171-176 may be coupled with the plurality of air ducts 71-76 (only one is shown in the view of FIG. 2), wherein each of the crop sensor devices 171-176 is coupled with one of the air ducts 71-76 for providing a signal indicative of a parameter of the harvested crop as it flows through one of the air ducts 71-76. The crop sensor devices 171-176 may provide a signal indicative of a quantity of the harvested crop as it flows through one of the air ducts 71-76 for example. As described above, each of the separate air ducts 71-76 is associated with one of the cotton picking row units 61-66 for communicating harvested crop from the cotton picking row units 61-66 to the crop receptacle 80. In that way, each of the plurality of crop sensor devices 171-176 may generate a crop signal indicative of a parameter of the harvested crop as it flows through a respective one of the air ducts 71-76 to which the crop sensor device is coupled. In an example, each of the plurality of crop sensor devices 171-176 may generate a signal indicative of a quantity of the harvested crop as it flows through a respective one of the air ducts 71-76 to which the crop sensor device is coupled.

With continued reference to FIG. 2, a feeder 115 is mutually coupleable with the chassis 20. The feeder 115 is configured to receive the cotton crop, or other crops in other implementations, from the accumulator 105. The feeder 115 includes a plurality of meter rollers 120 configured to compress the cotton, or other crop, and transfer the compressed cotton, or other crop, to the module builder 85 at a desired controlled feed rate. A first motor 125 is positioned to rotate the plurality of meter rollers 120. The first motor 125 may be hydraulic or electric.

At least one beater roller 130 is configured to cooperate with the plurality of meter rollers 120 to transfer the crop at a desired controlled feed rate. A second motor 135 is positioned to rotate the beater roller 130. The second motor 135 may be hydraulic or electric.

A feeder belt 140 is configured to receive crop from the plurality of meter rollers 120 and the at least one beater roller 130, and to transfer the cotton, or other crop to the throat 90 at a desired controlled feed rate. A third motor 145 is positioned to rotate the feeder belt 140. The third motor 145 may be hydraulic or electric.

Figure 3:
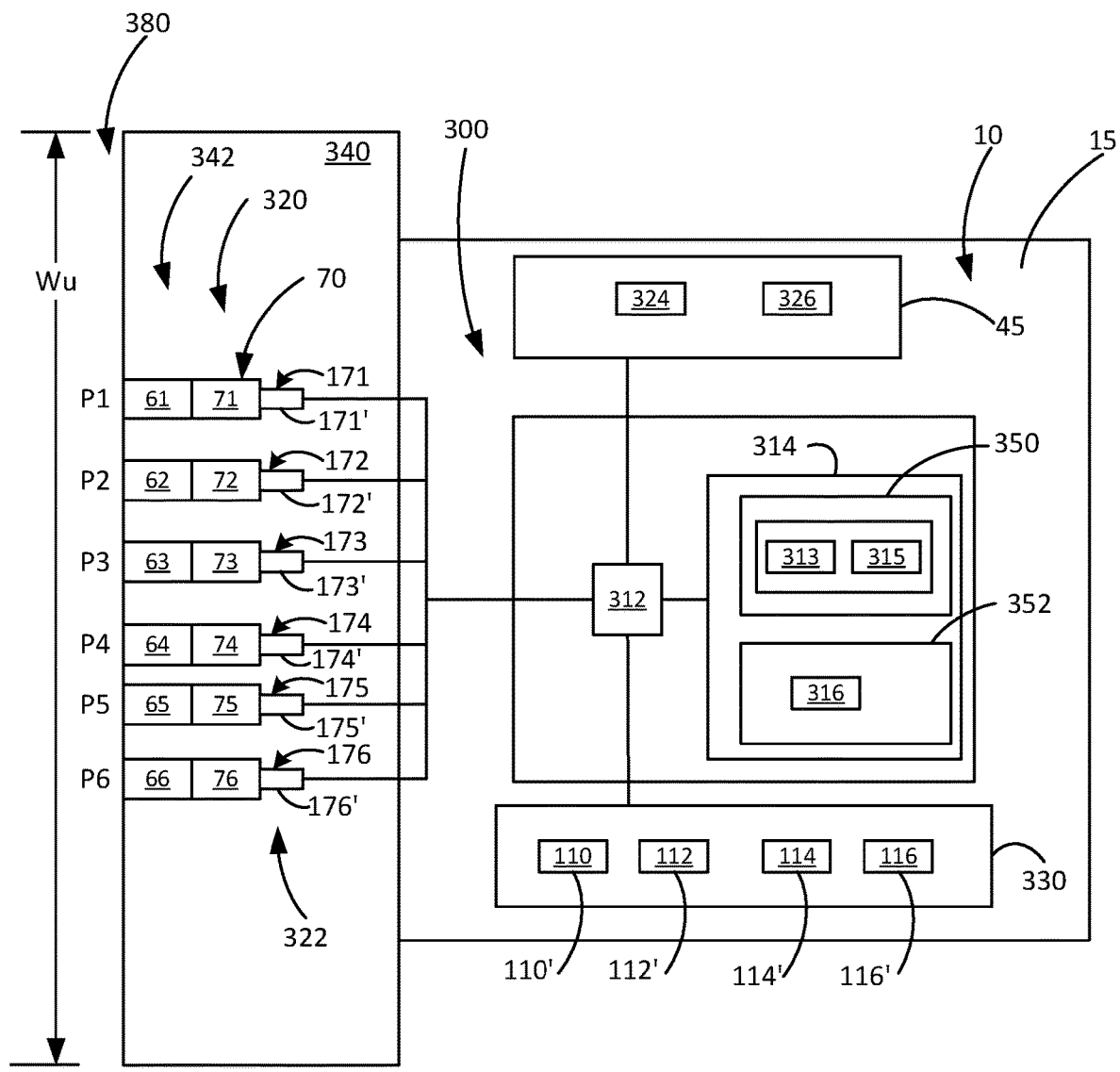
FIG. 3 is a schematic diagram of an example crop sensing system.

FIG. 3 schematically illustrates a crop sensing apparatus 300 in accordance with an example implementation. Crop sensing apparatus 300 collects, processes, and outputs data including for example crop data having enhanced resolution for increasing the operational efficiency of the harvester and for generating field maps having enhanced resolution. In the example implementation, the crop sensing apparatus 300 collects and processes crop data for control of one or more functional systems of the harvester including for example for active calibration of sensors that are used for sensing the harvest yield as the crops are collected. The calibration may be automatic and, further, the calibration may be automatic and continuous. In an example implementation, the term "resolution" refers to the level of detail with regard to crop data and/or field maps. Resolution for crop data or field maps is determined by the smallest unit for which an attribute is sensed or for which an attribute is derived. Generally, the smaller the unit, the greater the resolution. Crop sensing apparatus 300 outputs crop data and maps a field using sensed or derived attributes and/or identified conditions for individual units or portions of the field having a width less than a utilized crop harvesting width of a harvester. For example, even though the cotton harvester 15 may have a harvesting swath of six (6) rows given that there are six (6) cotton picking row units 61-66 in the illustrated example, crop sensing apparatus 300 may output crop data or field maps providing crop attributes such as, yield, for less than six (6) rows, such as on a row-by-row basis or even a plant-by-plant basis. Crop sensing apparatus 300 may be similarly implemented with respect to non-row crops and non-row harvesters. The greater crop data resolution provided by crop sensing apparatus 300 facilitates more advanced and sophisticated crop management.

The crop sensing apparatus 300 of the example implementation includes a crop sensing control system 310 configured to be disposed in any suitable agricultural machine, an example of which is the illustrated cotton harvester 15. The crop sensing control system 310 comprises a processor 312, a memory device 314 operatively coupled with the processor 312, control logic 316 stored in the memory device 314, a harvesting sensor 320 disposed at a harvesting head 340 of the harvester 15, and an accumulated crop sensor 330 disposed in an area of the harvester used for processing the crop at it is harvested such as for example in an area of the harvester used to bundle, weigh, and eject the processed crop bundles. The crop bundles are typically referred to as cotton "modules" in the example application of the implementations. Each of the harvesting sensor 320 and the accumulated crop sensor 330 may include one or more sensor devices.

In accordance with the example implementations herein, the one or more sensor devices of the harvesting sensor 320 include the plurality of crop sensor devices 171-176, and the one or more sensor devices of the accumulated crop sensor 330 include the moisture feedback device 110, the module mass feedback device 112, the module diameter feedback device 114, and the accumulator level feedback device 116.

As described above, the moisture feedback device 110 of the accumulated crop sensor 330 is operatively coupled with the crop receptacle 80 of the cotton harvester 15 and is operative to generate or otherwise provide a moisture level signal indicative of the moisture content of the crop contained in the crop receptacle 80. Similarly, the module mass feedback device 112 of the accumulated crop sensor 330 is coupled with the crop receptacle 80 of the cotton harvester 15 and is configured to generate or otherwise provide a bulk crop module wright signal indicative of the mass of each module after it is completed or otherwise built-up by the module builder 85. The module diameter feedback device 114 of the accumulated crop sensor 330 may be coupled with the crop receptacle 80 and is configured to generate or otherwise provide a crop module diameter signal representative of a measured diameter of the cotton module. The accumulator level feedback device 116 of the accumulated crop sensor 330 is coupled with the crop receptacle 80 and is configured to generate or otherwise provide an accumulator level signal representative of a measured level of harvested crop fill of the accumulator 105. The plurality of crop sensor devices 171-176 of the harvesting sensor 320 are disposed at the air duct system 70 of the cotton harvester 15.

Further in accordance with the example implementations herein, the control logic 316 stored in the memory device 314 is executable by the processor 312 to sense the crop as it is harvested by the cotton harvester 15, to perform crop yield estimation during and/or after the harvesting, to control one or more functions of the harvester, and to perform active calibration of the one or more crop sensing devices 322 of the harvesting sensor 320 in accordance with the example implementations as will be described in greater detail below. As described, the active calibration may be automatic and, further, the calibration may be automatic and continuous.

The crop sensing control system 310 in general includes a processor 312, and a memory device 314 operably coupled with the processor. Operational data 313 is stored in the memory device, wherein the operational data comprising harvester data is representative of an operational characteristic of the cotton harvester 15. In addition, base calibration factor data 315 is stored in the memory device, wherein the base calibration data is representative of a base calibration factor $CF_{base}$. In an example, the base calibration factor data 315 may include plural base calibration factor data 315 selectable by the operator based on crop variety, a location of the harvest being conducted, a time of season/year of the harvest being conducted, one or more physical parameters of the harvester such as for example a width of the harvester head, and/or combinations of these parameters or others. In further addition, control logic 316 is stored in the memory device and is executable by the processor to determine the yield of the cotton harvested as described herein.

As described above, the cotton harvester 15 comprises a mobile machine configured to travel across a field or plot of land while harvesting a crop. The cotton harvester 15 includes a harvesting head 340 and harvester head components 342 disposed on and/or within the harvesting head 340. The cotton harvester 15 of the particular example implementation includes a harvesting head 340 comprising the harvesting structure 60 described above, and the harvester head components 342 comprise the cotton picking row units 61-66 and the air duct system 70 comprising the plurality of separate air ducts 71-76 described above. In other implementations, the harvesting head 340 and harvester head components 342 may comprise other types of agricultural machines.

The harvesting head 340 comprises a mechanism configured to gather and harvest a crop such as cotton along a swath. The swath of head 340 has a utilized width, Wu, when harvesting crops. In an example implementation, the utilized width Wu constitutes that portion of the length or swath width that is being utilized to harvest crops at a particular time. Although in most instances, the utilized width Wu is equal to the physical length of the swath of head 340, in some circumstances, the utilized width Wu may constitute only a portion of the swath of head 340, such as along an end row, waterway, previously harvested transport corridor, and/or the like.

Harvesting components 342 comprise various mechanisms for harvesting, such as mechanisms to sever or separate the crop from a remainder of a plant. In the example implementation, the harvesting components 342 comprise picker spindles, doffers, picker ribs, plant lifters, spindle cleaning systems, and the like commonly found in typical row unit structures of cotton harvesters. Such mechanisms may also include knives or blades, stripper plates, rollers, snapping roles, augurs, gathering chains or belts and/or the like. In one implementation, head 340 comprises cotton picking row units 61-66 to separate cotton from a cotton plant. In another implementation, head 340 comprises components to separate a sugar or oil bearing plant stalk from plant leaves. In another implementation, the harvesting head 340 may comprise a grain head for a combine, wherein the grain along with the stalk is severed and subsequently threshed by the combine. In another implementation, head 340 comprises a corn head for a combine, wherein the corn head separates ears of corn from the remaining stalk. In another implementation, head 340 comprises a head having stripper plates or other mechanisms to sever other types of ears from associated stalks. In one implementation, the term "ear" refers to a seed-bearing part of a plant, such as ears of corn, seed laden flowers such as sunflowers, pods and the like. In other implementations, head 340 and components 342 may have other configurations. For example, although head 340 is illustrated as being located at a forward end of cotton harvester 15 and as being interchangeable with other heads (facilitating the change of cotton, corn and grain heads). In other implementations, head 340 may be supported at other locations by the cotton harvester 15 and/or may be a permanent, non-interchangeable component of cotton harvester 15.

The one or more sensor devices of the harvesting sensor 320 and accumulated crop sensor 330 comprise mechanisms to sense or detect one or more characteristics of the crops being harvested. Each of the one or more sensor devices outputs signals based upon these sensed characteristics. Examples of the one or more sensor devices of the harvesting sensor 320 and the accumulated crop sensor 330 include, but are not limited to, voltage sensors, current sensors, torque sensors, hydraulic pressure sensors, hydraulic flow sensors, magnetic sensors, force sensors, bearing load sensors, rotational sensors, mass sensors, mass flow sensors, radar sensors, ultrasonic sensors, Radio Detection and Ranging (RADAR) sensors, Light Detection and Ranging (LIDAR) sensors, Frequency Modulated Continuous Wave (FMCW) RADAR sensors, imaging and/or vision sensors, Light Amplification by Stimulated Emission of Radiation (LASER) sensors, or the like. The measured parameters may vary based upon characteristics of the plant crops presently being harvested and also based on the location in the harvester where the measurement is taking place. For example, for the cotton harvester 15 of the example implementation the crop sensor devices 171-176 may comprise mass flow sensors 171'-176' each being configured to generate one or more signals such as for example electrical signals representative of the mass flow rate of the harvested cotton columns as they flow through respective ones of the plurality of separate air ducts 71-76 towards the accumulator 105. The mass flow sensors 171'-176' may use any of the technologies identified above such as for example RADAR or others to sense the mass of the crop as it is being harvested, and further may be configured to generate one or more electrical signals representative as raw data signals of the mass, speed, direction, etc. of the harvested cotton columns as the cotton flows through respective ones of the plurality of separate air ducts 71-76 towards the accumulator 105. The one or more raw data signals are converted into a cotton mass flow rate using a suitable transformation in order to be useful for processing as described herein in accordance with the implementation. It is to be appreciated that in lieu of or in addition to the raw data signals of the mass, speed, direction, etc., the mass flow sensors 171'-176' may also directly generate and output a mass flow signal representative of the mass flow rate of the harvested cotton columns as the cotton flows through respective ones of the plurality of separate air ducts 71-76 towards the accumulator 105. For further example, for the cotton harvester 15 of the example implementation, the moisture feedback device 110 comprises a moisture sensor 110' configured to generate an electrical signal representative of a level of moisture of the harvested cotton, the module mass feedback device 112 comprises a strain gauge 112' configured to generate an electrical signal representative of the mass of the cotton module after it is formed by the module builder 85, the module diameter feedback device 114 may be a position sensor 114' coupled with an arm member capable of engaging the outer side of the cotton module and generating a signal having a magnitude indicative of the diameter of the cotton module based on the position of the arm member relative to the crop receptacle 80, and the accumulator level feedback device 116 may be an optical sensor device 116' capable of generating a signal having a magnitude indicative of the fill level of the accumulator 105.

Each of the crop sensors 171-176 senses one more crop attribute values or parameters for crops harvested by a corresponding distinct portion of the utilized width Wu. In the example illustrated, each of the crop sensors 171-176 senses a characteristic that indicates a crop attribute for plants along an individual row, providing "per row" crop attributes. As indicated by partitioning 380, the utilized width Wu is partitioned or divided into six (6) equal portions P1-P6, such as row units, wherein the crop sensors 171-176 each sense characteristics of the crops or plants collected from the portions P1-P6, respectively. In the example illustrated, each portion or each row unit includes a dedicated mass flow sensor 171'-176'. In other implementations, components may be shared amongst different portions or row units. Likewise, sensors may be shared amongst multiple components or multiple row units. In some implementations, in lieu of providing per row crop attributes, crop sensors 171-176 shared amongst rows alternatively sense characteristics of the crop or plant as they are harvested to determine crop attributes for groups of rows less than the total harvesting width Wu. Crop attributes may also comprise grain yield and/or biomass yield or the like.

Although the harvesting head 340 is illustrated as including six (6) sensors, in other implementations, head 340 may include a greater or fewer number of such sensors along the physical width or swath of head 340. For example, a crop row harvester may have greater than or less than six (6) rows, wherein the head of the harvester may similarly divide with greater than or less than six row sensing sensors. Although head 340 is illustrated as being partitioned into equal portions, in other example implementations, head 340 is partitioned into unequal portions, wherein sensors sense characteristics of the harvested crop for the unequal portions. For example, in another implementation, one of crop sensors 171-176 senses or detects characteristics of the crop or plant as it is harvested from an individual row, while another one of crop sensors 171-176 senses or detects characteristics of the crop or plant as it is harvested from a plurality of rows.

In some implementations, crop sensors 171-176 sense characteristics of the harvested crop based upon time, distance, a number of plants, and/or the like over time for detecting trends in the data. This may also help to reduce the amount of data that is processed or stored. In some implementations, each of crop sensors 171-176 may additionally or alternatively offer a degree of crop sensing resolution by being configured to detect the characteristics of each individual plant as the cotton harvester 15 traverses a field, providing an indication from which a per plant grain or biomass yield estimate is determined. Aggregating individual plant data and/or trends in the collected data may also improve usability of the data by eliminating noise in the data.

The operator interface 45 is coupled with the processor 312 as shown and includes in the example implementation a display 324 comprising a device by which information may be visually presented to an operator of the cotton harvester 15 or to a remotely located monitor/manager/operator of the cotton harvester 15. Display 324 may comprise a monitor or screen which is stationary in nature or which is mobile in nature. In one implementation, display 324 is carried by the cotton harvester 15 along with the human operator. In another implementation, the display 324 comprises a stationary monitor remote from the cotton harvester 15. In yet other implementations, the display 324 may be mobile in nature, being provided as part of a computer tablet, smart phone, personal data assistant (PDA) and/or the like. In yet other implementations, the display 324 may be provided as part of a computer network for data transfer using the Internet and/or cloud connections for display and use of the information in applications and/or on websites or the like such as at remote supervisory facilities or the like.

The operator interface 45 of the example implementation further includes an input 326 comprising one or more devices by which controls and input may be provided to the processor 312. Examples of input 326 include, but are not limited to, a keyboard, a touchpad, a touch screen, a steering wheel or steering control, a joystick, a microphone with associated speech recognition software and/or the like. Input 326 facilitates the input of selections, commands or controls. In implementations where the cotton harvester 15 is remotely controlled or remotely steered, the input 326 may facilitate such remote steering and/or control. The operator interface 45 of the example implementation may be used by the operator using the input 326 for operator selection of an initial base calibration factor from the memory device 314 from a plurality of calibration factor data 315 based on for example crop variety, a location of the harvest being conducted, a time of season/year of the harvest being conducted, one or more physical parameters of the harvester such as for example a width of the harvester head, and/or combinations of these parameters or others. The control logic 316 is stored in the memory device is executable by the processor to determine the yield of the cotton harvested based on factors including the initial base calibration factor selected by the operator and as described herein.

The memory device 314 comprises a non-transient computer-readable medium or persistent storage device for storing data for use by the processor 312 and/or generated by the processor 312. In one implementation, the memory device 314 may additionally store instructions in the form of code or software for execution by the processor 312. The instructions may be loaded in a random access memory (RAM) for execution by the processor 312 from a read only memory (ROM), a mass storage device, or some other persistent storage. In other implementations, hard wired circuitry may be used in place of or in combination with software instructions to implement the functions described. For example, at least regions of the memory device 314 and the processor 312 may be embodied as part of one or more application-specific integrated circuits (ASICs). In one implementation, the memory device 314 is carried by the cotton harvester 15. In other implementations, the memory device 314 may be provided remote from the cotton harvester 15 and in communication with the cotton harvester 15 in a wireless fashion.

In the example illustrated, the memory device 314 comprises a data storage portion 350 and a logic storage portion 352. The data storage portion 350 contains historical data, such as lookup tables, facilitating analysis of data and information sensed by sensors 110, 112, 114, 116, and 171-176. The data storage portion 350 is further configured to store the crop characteristic values directly sensed by the sensors 110, 112, 114, 116, and 171-176 and crop attribute values for correlating various different types of crops that are harvested with the determined crop characteristic values during harvest. Such stored information may be in various formats such as tables, field maps and/or the like. Data storage portion 350 may additionally store various settings and operator preferences. The logic storage portion 352 contains the control logic 316 that is executable by the processor 312 to sense the crop as it is harvested by the cotton harvester 15 and to perform crop yield estimation, to control one or more functions of the harvester, to perform active calibration of the one or more crop sensing devices 322 of the harvesting sensor 320 in accordance with the example implementations as described herein, and to perform any other functions as may be necessary or desired. Data storage portion 350 may additionally store various settings and operator preferences and/or selections such as for example crop variety, a location of the harvest being conducted, a time of season/year of the harvest being conducted, one or more physical parameters of the harvester such as for example a width of the harvester head, and/or combinations of these parameters or others in association with sensed crop as it is harvested by the cotton harvester 15. This is useful for example to perform highly refined crop yield estimation, to control one or more functions of the harvester, to perform active calibration of the one or more crop sensing devices 322 of the harvesting sensor 320 in accordance with the example implementations as described herein, and to perform any other functions as may be necessary or desired.

The control logic 316 instructs processor 312 to generate control signals causing display 324 to present various information and/or prompts to an operator. For example, the control logic 316 may cause processor 312 to prompt an operator to select whether or not and how individual crop characteristic data is to be aggregated, how data is to be displayed (graph, chart, field map), what conditions are to be identified, how the operator is notified or alerted to such conditions, where such data is to be stored, the manner in which the data is stored, and/or the like. For example, the control logic 316 may cause processor 312 to store the data related to the sensed crop as it is harvested by the cotton harvester 15 in association with various settings and operator preferences and/or selections such as for example crop variety, a location of the harvest being conducted, a time of season/year of the harvest being conducted, one or more physical parameters of the harvester such as for example a width of the harvester head, and/or combinations of these parameters or others. The harvested crop data associated with the one or more other parameters, settings, preferences, etc. may be stored in a table in the memory device 314 such as for example in a database. The control logic 316 may further instruct processor 312 in the display of data per operator preferences.

The control logic 316 comprises code or programming which directs processor 312 to automatically generate control signals adjusting operational parameters of the cotton harvester 15 based upon directly sensed crop characteristic values or/or derived crop attribute values. In one implementation, operations the control logic 316 generates control signals independently adjusting operational parameters of distinct portions of the harvesting head 340 along its utilized width Wu. For example, the control logic 316 may adjust the operational parameters of one or more of the cotton picking row units 61-66 independent of or differently with respect to another cotton picking row unit of the head 340 based upon directly sensed or derived crop characteristic values. For example, the control logic 316 may, automatically, in response to sensed or derived crop characteristic values of one or more particular row unit(s) 61-66, generate control signals for an actuator coupled to stripper plates of the row unit to adjust the spacing of stripper plates. This adjustment of stripper plates for the particular row unit may be independent of and different from the spacing adjustment of other stripper plates for other row units. As a result, the enhanced crop sensing resolution provides enhanced more refined control over the operation of the cotton harvester 15 to better harvest crops.

Figure 4:
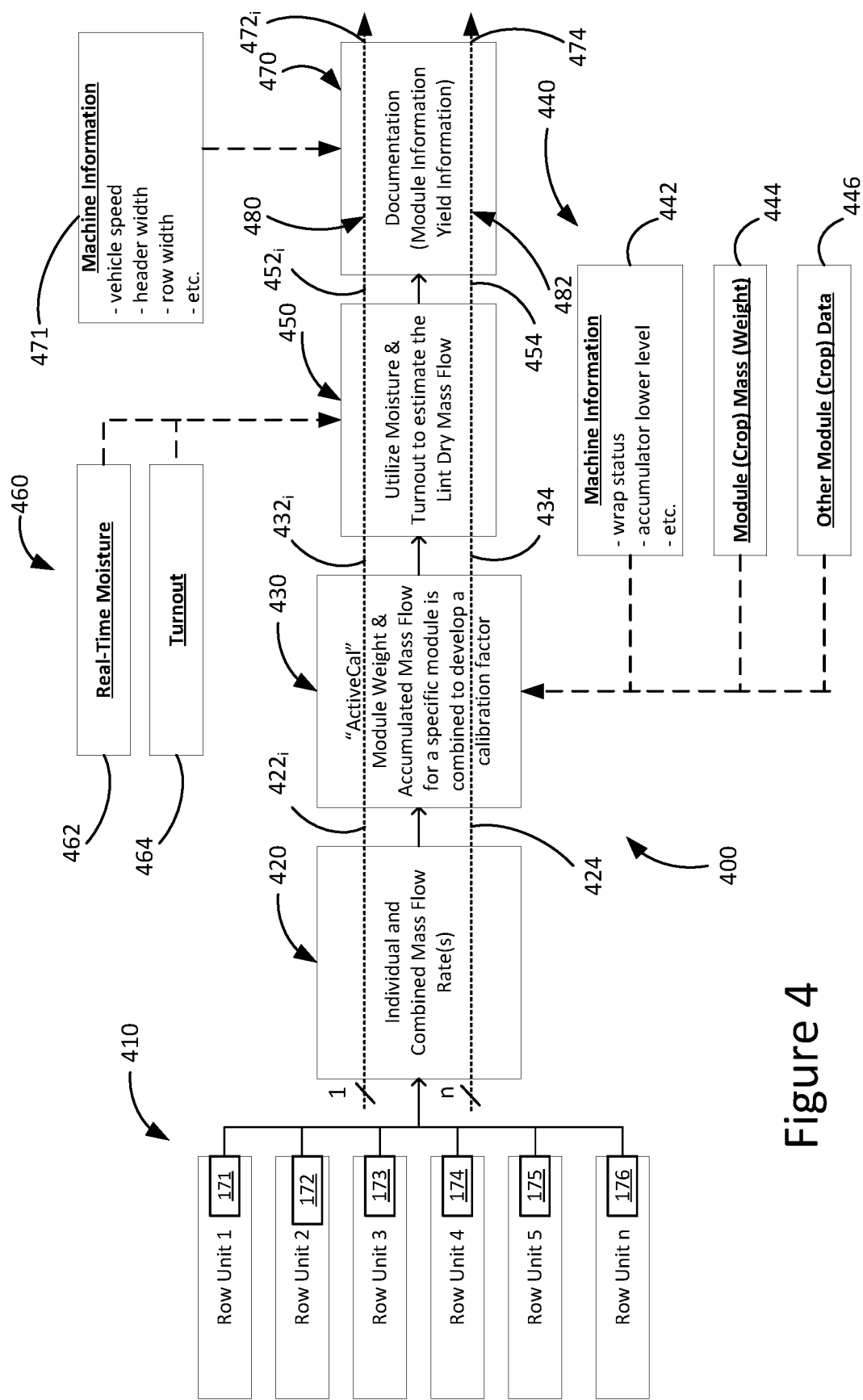
FIG. 4 is a functional block diagram showing a process of flow yield estimation and harvester control using active crop flow sensing calibration in accordance with an example implementation.

FIG. 4 is a functional block diagram showing a process 400 of flow yield estimation and harvester control using active crop flow sensing calibration in accordance with an example implementation. With reference now to that Figure, the process 400 includes sensing at functional block 410 the flow of crop harvested by each of the cotton picking row units 61-66 using suitable means such as for example the plurality of crop sensor devices 171-176. The raw sensor response from each crop sensor is combined at functional block 420 into an estimated machine seed cotton wet mass flow rate in a manner to be described in greater detail below.

As described above, the cotton is bundled into modules after it is harvested. The cotton harvester is operative to continue harvesting cotton and directing it into the accumulator 105 at the same time as the cotton is being bundled into the modules at the module builder 85 portion of the harvester. In accordance with the implementations herein, the mass of each module is compared against the estimated mass of the module as determined using the crop sensor devices 171-176 so that a calibration factor may be determined and actively updated for more accurate crop yield determination. The process 400 performs an active calibration at functional block 430 using input obtained from the harvester 15 such as for example one or more of machine information 442, module mass information 444, and module moisture information 446, the details of which will be described in greater detail below. The machine information 442 may include information relating to a module wrap status, an accumulator lower level, and/or any other information obtained from the harvester 15 that may be useful in calibrating the system for obtaining highly accurate crop yield information. In general, however, the mass flow for a specific module is accumulated and processed using a base calibration factor and the module mass is measured and compared against the expected mass using the base calibration factor to develop an updated calibration factor. The updated calibration factor is used during the processing of subsequent modules until it is selectively updated as described herein.

Lint dry mass flow is determined at functional block 450 using input 460 obtained from the harvester 15 such as for example moisture information 462 and turnout information 464, the details of which will be described in greater detail below. In general, however, the lint dry mass determination is benefitted from the active adjustments made to the calibration factor (CF) at functional block 430 for more accurate yield determination.

Module and yield information is determined at functional block 470 using for example machine information 471 that may include information relating to the forward speed of the harvester 15, the width of the crop picking header, the width of the crop rows, and/or any other information obtained from the harvester 15 that may be useful by the system in obtaining highly accurate crop module and yield information. The module and yield information may be stored in the memory device 314, for example. The module and yield information comprises crop data having enhanced resolution for increasing the operational efficiency of the harvester and for generating field maps having enhanced resolution. In the example implementation, the crop data may also be used for control of one or more functional systems of the harvester.

As described above, the harvesting structure 60 may be a cotton harvesting structure such as shown for use in a cotton harvester 15, and may include one or more cotton picking row units 61-66, a stripper header, or any other harvesting structure (e.g., corn head). In this regard it is to be appreciated that in the example implementations, the process 400 of flow yield estimation and harvester control using active crop flow sensing calibration may be performed on individual crop row basis such as for each of one (1) of six (6) in the example or on an aggregation of two or more crop rows, such as six (6) in the example. For this the arrow 480 through the processing at functional blocks 420-470 and designated with a "/1," a "$422_i$," a "$432_i$," a "$452_i$," a "$472_i$" is representative of the flow yield estimation and harvester control using active crop flow sensing calibration of the present disclosure rendered on a per crop row basis, wherein plural such individual information sets relating to individual ones i from 1 to 6 in the example of the plural cotton picking row units 61-66 are determined, processed, and stored or otherwise delivered. This provides a highly accurate and detailed yield maps. The arrow 482 through the processing at functional blocks 420-470 and designated with a "/n," a "424" a "434" a "454," and a "472" is representative of the flow yield estimation and harvester control using active crop flow sensing calibration of the present disclosure rendered on an aggregated crop row basis, wherein a single information set relating to the plural cotton picking row units 61-66 is determined, processed, and stored or otherwise delivered. This also provides a highly accurate and detailed yield map.

The active calibration described herein creates highly accurate yield maps at row-by-row level with minimal manual operator interface. This is achieved in the example implementation by the processor 312 executing control logic 316 and using selected statistical data to manage the individual sensor 171-176 output. The calibration is achieved, in general, in logical parts or portions including for example a normalization of the varying mass flow sensor signal magnitudes, and calculating adjustment calibration factors based on onboard handler mass and module moisture. In accordance with the example implementations, the system continually functions in the background while harvesting to provide accurate data with little to no need for operator input.

Figure 5:
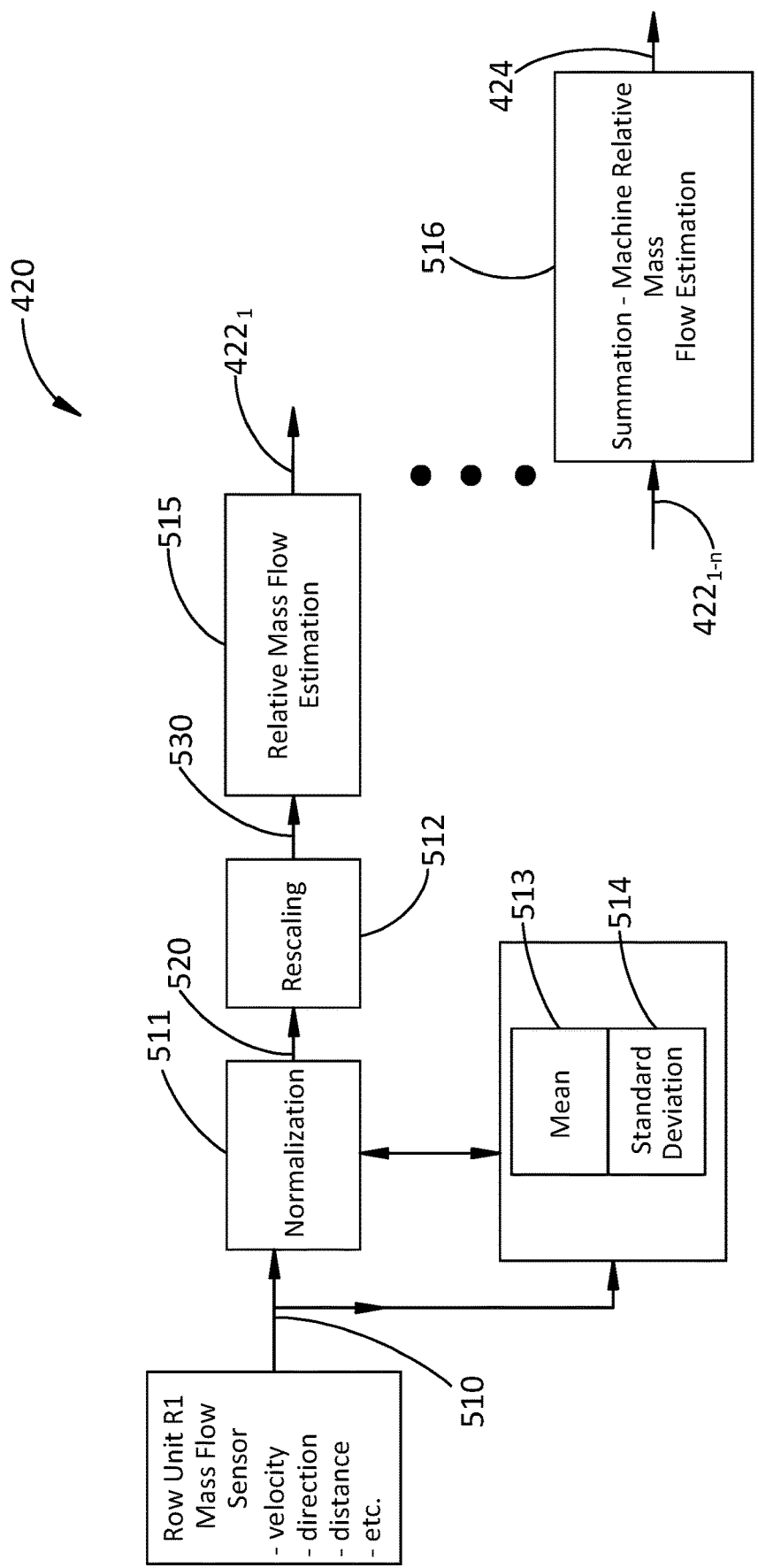
FIG. 5 is a functional flow diagram showing crop yield mass flow estimation in accordance with an example implementation.

The sensor raw readings of the crop sensor devices 171-176 are normalized 511 in the example implementation such as shown in FIG. 5 in order to compare signals across multiple sensors where the sensor response varies due to circuitry, sensitivity, and installation. Through the process of normalization the sensor response is assumed to be a normally distributed signal. Normalization of the sensor responses results at 520 in a mean signal of 0 with a standard deviation of 1.

$$x' = \frac{x - \bar{x}}{\sigma} \qquad \text{Equation 1}$$

where:
x'=normalized signal
x=signal
$\bar{x}$=signal mean
σ=signal standard deviation The normalized signal 520 (FIG. 5) having a mean value of 0 and standard deviation of 1 is then rescaled at 512 to have a mean of 0.5 with a standard deviation of 1.

$$x'' = \frac{x'}{6} + 0.5 \qquad \text{Equation 2}$$

where:
x"=rescaled normalized signal
x'=normalized signal

The ability to normalize the signals real-time relies in the example implementation on the theory of the signal being normally distributed and to ensure that a wide range of the sensor response is captured. Thus the example implementations herein capture data over a long duration to understand the sensor response in low and high flow conditions. This theory is used to estimate the signal mean and standard deviation which can be applied to the normalization process.

The signal mean is estimated at 513 by an optimal real-time equation which reduces the need for storing significantly large arrays of past data.

$$\bar{x} = \bar{x}_{i-1} + \frac{(x - \bar{x}_{i-1})}{n} \qquad \text{Equation 3}$$

where:
$\bar{x}$=signal mean
x=signal
$\bar{x}_{i-1}$=signal mean last iteration
n=signal count The signal variation is estimated at 514 by an optimal real-time equation which reduces the need for storing significantly large arrays of past data. The square root is then computed of the variation to get the standard deviation.

$$\sigma^2 = \sigma_{i-1}^2 + \frac{(x - \bar{x}_{i-1}) * (x - \bar{x}) - \sigma_{i-1}^2}{n} \qquad \text{Equation 4}$$

where:
$\sigma^2$=signal variance
$\sigma_{i-1}^2$=signal variance last iteration $\bar{x}$=signal mean
x=signal
$\bar{x}_{i-1}$=signal mean last iteration
n=signal count
$\sigma = \sqrt{\sigma^2}$=standard deviation For a physical system signal counts (n) may be explored from 500 to 1,000,000 for example on both the mean and variance estimation. It that way, a balance may be found to exit to have enough data to normalize the sensor out for all conditions while allowing some flexibility versus having too little data and optimizing to a specific field condition rather than optimizing the sensor true response.

As noted above, the crop sensor devices 171-176 may be configured to generate one or more electrical signals representative as raw data signals of the mass, speed, direction, etc. of the harvested cotton columns as the cotton flows through respective ones of the plurality of separate air ducts 71-76 towards the accumulator 105. In accordance with the example implementation, the one or more raw data signals are converted into a cotton mass flow rate using a suitable transformation 515 in order to be useful for processing as described herein in accordance with the implementation. The normalized and rescaled signals 530 are further processed by the transformation 515 for correlating sensor response to a mass flow rate 422. This provides a relative mass flow estimation utilizing the normalized signals from the mass flow sensor. This results in a unique relative mass flow estimation 422n for each individual row unit.

Figure 6A:
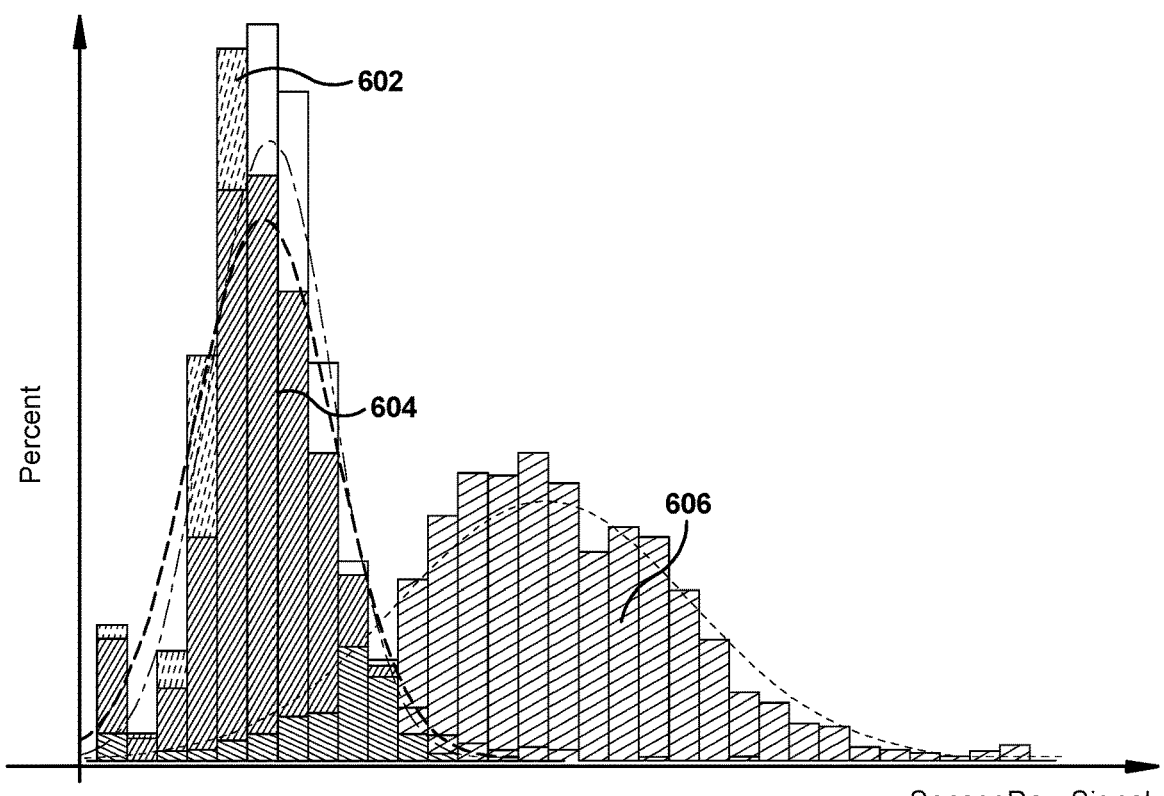
FIG. 6a is an illustration of signals received from sensors in accordance with an example implementation.
Figure 6B:
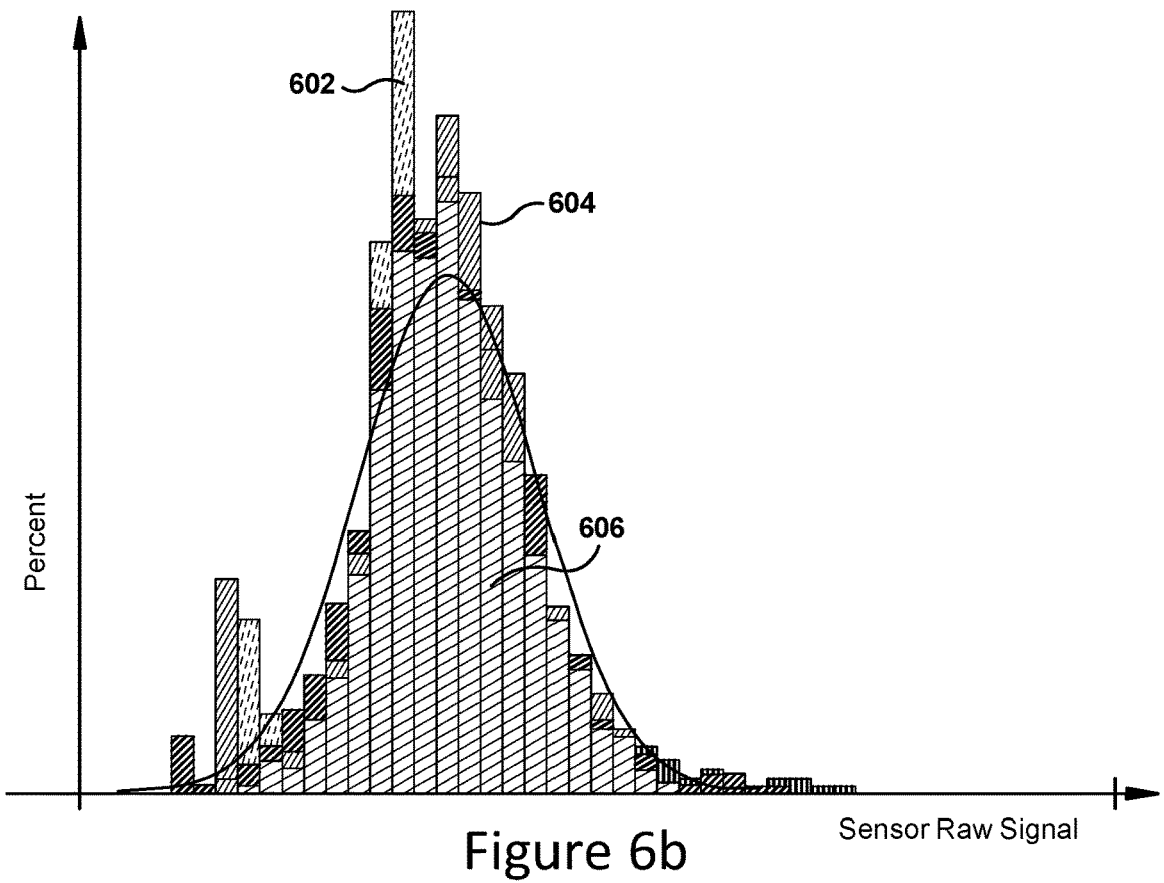
FIG. 6b is an illustration of the signals of FIG. 6a and normalized in accordance with an example implementation.

The relative machine mass flow rate 424 is estimated 516 by summing the relative row unit mass flow rate for all row units. The relative machine mass flow rate 424 is utilized in the calibration process of converting relative row unit mass flow to an absolute mass flow.

$$\dot{m}_{machine} = \sum_{i=0}^{n} \dot{m}_i \qquad \text{Equation 5}$$

where:
$\dot{m}_{machine}$=mass flow rate of machine
$\dot{m}_i$=mass flow rate for sensor i
n=total number for sensors The normalization 511 and the rescaling 512 processes can be demonstrated by observing FIG. 6a. Comparing three signals 602, 604, 606 shown by way of example such as being generated by the sensor devices 171, 172, and 173 which were subject to similar crop conditions the sensor response is similar among two row units 61, 62 while significantly different on the third signal 173'. With a larger mean in response the signal can vary more which causes the standard deviation to be larger. FIG. 6b demonstrates the normalization process which aligns the three (3) signals of the mathematical example to equal mean and standard deviation.

Figure 7:
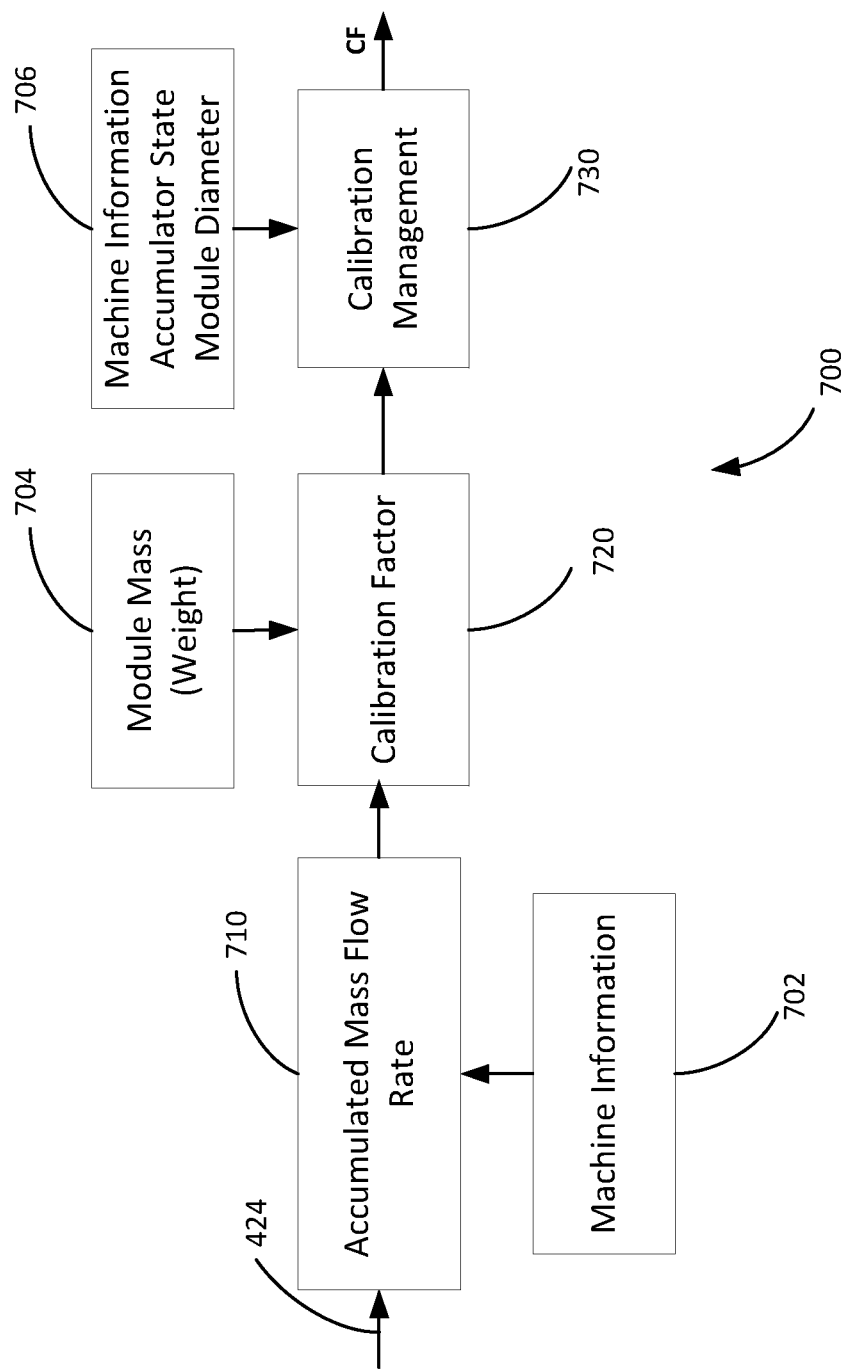
FIG. 7 is a functional flow diagram showing steps in managing a calibration factor in accordance with an example implementation.

With reference to FIG. 7, the relative machine mass flow 710 is utilized 700 in combination with machine (cotton harvester 15) logic 702 such as a module wrap state of the module builder 85, and the module masses 704 as measured by the module mass feedback device 112 at the module handler 80 onboard the cotton harvester 15.

Figure 8:
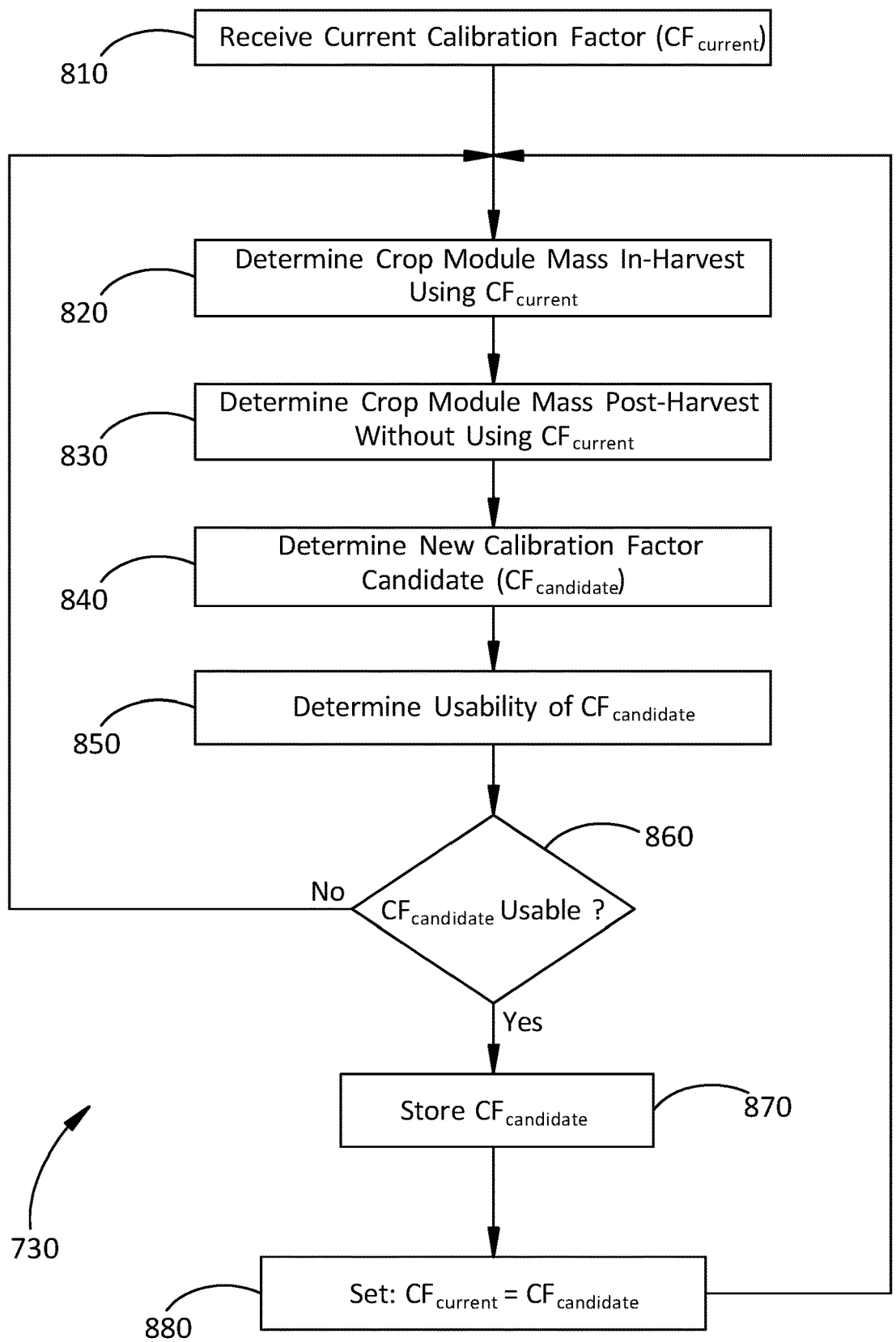
FIG. 8 is a flow diagram illustrating a method for managing the calibration factor of FIG. 7 in accordance with an example implementation.

The accumulated mass is calculated at 710 from the integration of the relative mass flow rate 424 (FIGS. 5 and 7) on a unique module basis. The end of a module has typically been defined as the start of a wrap cycle. Therefor the start of the next module also occurs at the start of a wrap cycle.

$$m_{accumulated} = \int_{t=0}^{t=n} \dot{m}_{relative} \qquad \text{Equation 6}$$

where:
 $m_{accumulated}$=mass accumulated over time
 t=0, beginning of module
 t=n, end of module
 $\dot{m}_{relative}$=mass flow rate noncalibrated The module masses captured via the handler are considered the ground truth for this system and is relied upon to calibrate 720 the relative or non-calibrated mass flow rate to an absolute or calibrated mass flow rate.

$$CF = \frac{m_{accumulated}}{m_{module}} \qquad \text{Equation 7}$$

where:
 CF=calibration factor
 $m_{accumulated}$=mass accumulated over time
 $m_{module}$=mass of module The calibration factor CF is then applied to the relative or non-calibrated mass flow rate to arrive at an absolute or calibrated mass flow rate.

$$\dot{m}_{calibrated} = \dot{m}_{relative} * CF \qquad \text{Equation 8}$$

where:
 $\dot{m}_{calibrated}$=mass flow rate calibrated
 $\dot{m}_{relative}$=mass flow rate noncalibrated
 CF=calibration factor With reference next to FIG. 8, the calibration management 730 uses selected criteria to handle or otherwise determine when to update the calibration factor CF along with determining at each module end cycle if enough confidence exists to utilize that particular module in the calibration procedure.

One criteria that may be checked or that could be considered in the process is to verify that the module diameter is larger than 2.2 m. using for example the module diameter feedback device 114. Another criteria that may be checked or that could be considered in the process is to verify an accumulator empty state as determined based on the lower level sensor using for example the accumulator level feedback device 116. Another criteria that may be checked or that could be considered in the process is to verify that the module mass is greater than 0 kg, and that the module mass is not a null value, e.g. greater than 60,000 kg. using for example the module mass feedback device 112.

The cotton module diameter is closely monitored as the accuracy of the module mass from the handler is expected to be more favorable in larger diameters modules. Small diameter modules are uncommon however do occur in such instances as during field transitions or yield trial studies.

Accumulator sensor states are also closely monitored as during the module build process it is possible that material is left in the accumulator at wrap cycle start. The material accounted for in the accumulator which didn't make it into the module results in known error in the calibration factor.

In the calibration management 730 of the example implementations, the current calibration factor $CF_{current}$ is received at step 810 such as for example by retrieving the $CF_{current}$ from the memory device 314.

At step 820 the crop module mass is determined while the crop is being harvested using for example the sensors 171-176 and the processes 410 and 420 shown in FIGS. 4 and 5 as described above.

At step 830 the mass of the module accumulated during step 820 is determined post-harvest using for example the module mass feedback device 112.

A new candidate calibration factor $CF_{candidate}$ is determined at step 840 using for example the Equation 8 described above.

The usability and/or viability of the new candidate calibration factor $CF_{candidate}$ is determined at step 860. In accordance with the example implementations herein, the usability and/or viability of the new candidate calibration factor $CF_{candidate}$ is determined based on criteria such as those described above, for example. That is, the new candidate calibration factor $CF_{candidate}$ is determined to be usable and/or viability based on the module diameter is larger than 2.2 m. using for example the module diameter feedback device 114. The new candidate calibration factor $CF_{candidate}$ is determined to be unusable and/or not viability based on the accumulator 105 being not empty (partially full) as determined based on the lower level sensor using for example the accumulator level feedback device 116. The new candidate calibration factor $CF_{candidate}$ is determined to be usable and/or viability based on the module mass being greater than 0 kg, and not being a null value, e.g. greater than 60,000 kg. using for example the module mass feedback device 112.

If the new candidate calibration factor $CF_{candidate}$ passes all of the criteria as determined at step 860 the new candidate calibration factor $CF_{candidate}$ is stored for example in the memory device 314. Otherwise, the new candidate calibration factor $CF_{candidate}$ is discarded and the process is repeated.

The current calibration factor $CF_{current}$ is replaced with the calibration factor $CF_{candidate}$ at step 880 for use as a new current (live) calibration factor for subsequent and/or ongoing (live) crop yield determinations.

Figure 9A:
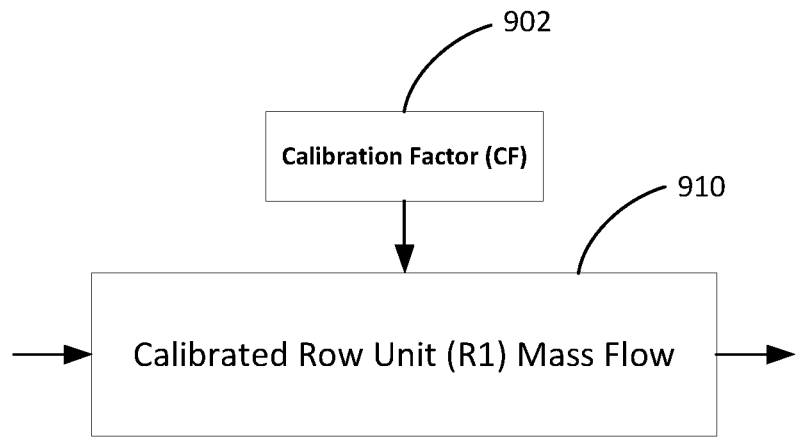
FIGS. 9a and 9b are functional flow diagrams showing application of the managed calibration factor applied to crop flow data in accordance with an example implementation.
Figure 9B:
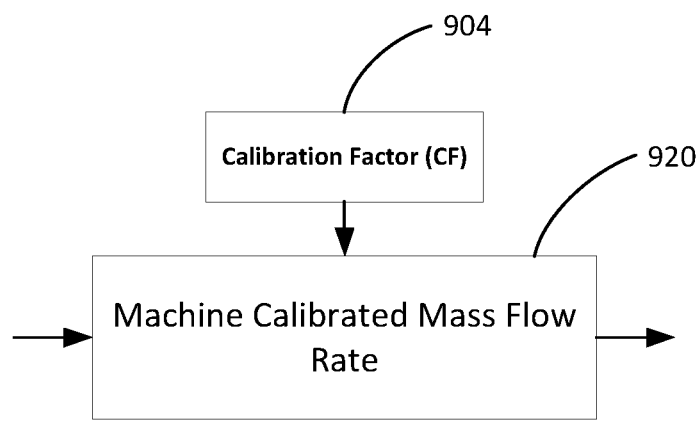
Figure 10A:
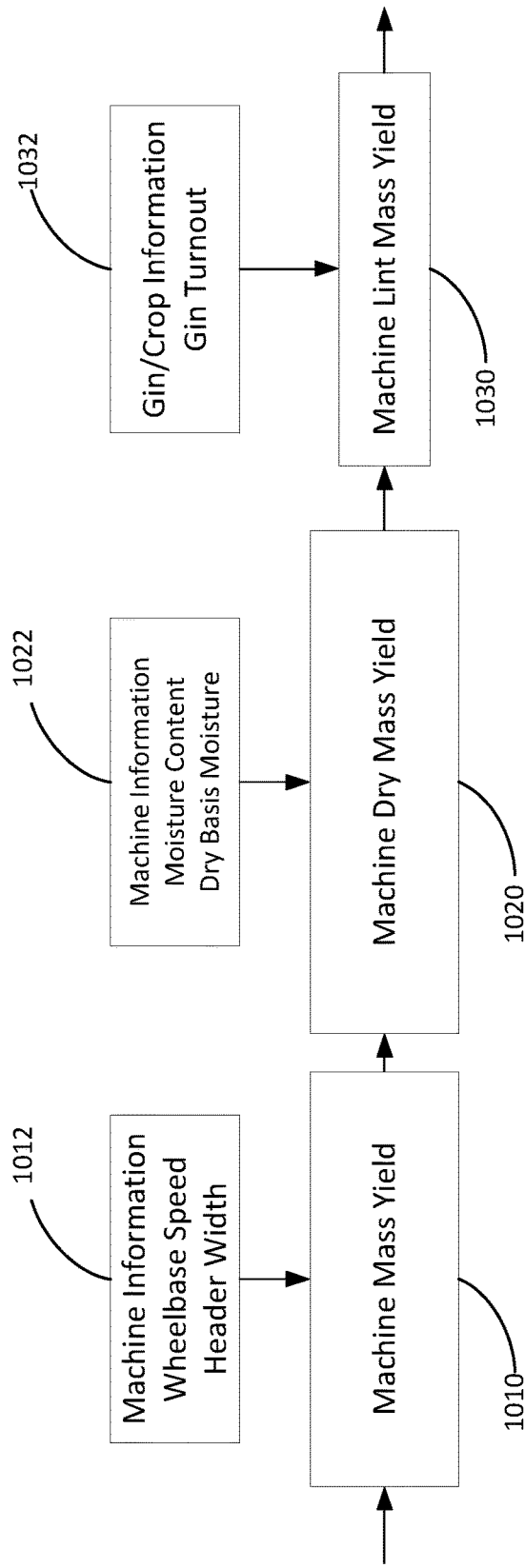
FIGS. 10a and 10b are functional flow diagrams showing application of the managed calibration factor applied to crop flow data in accordance with an example implementation.
Figure 10B:
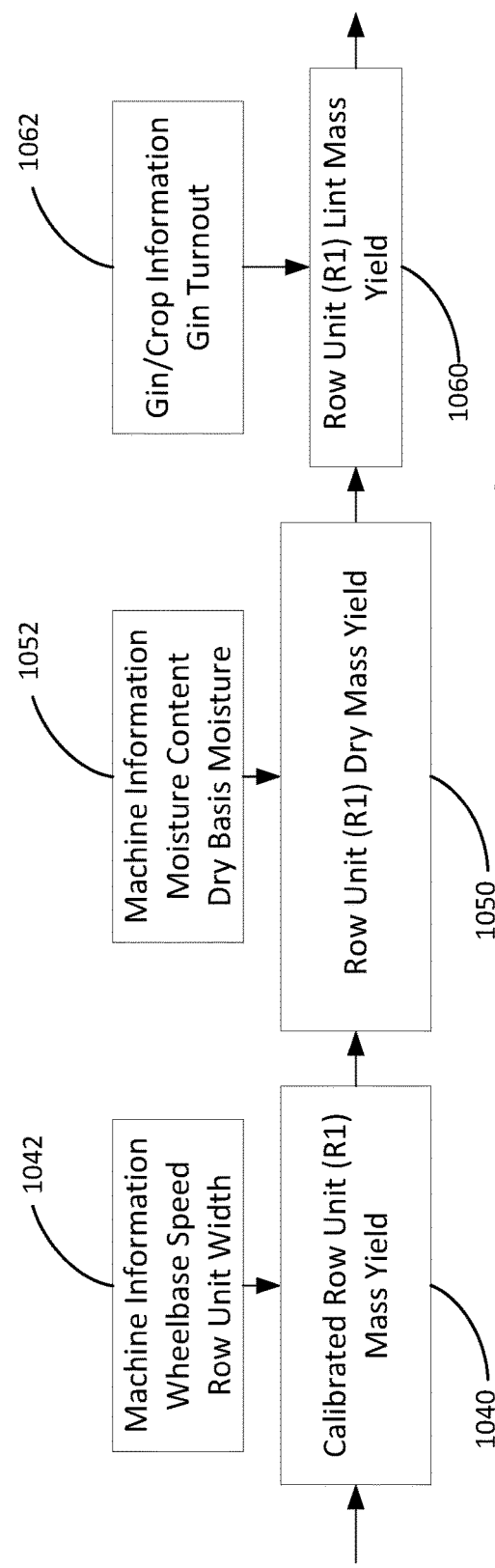
Figure 11A:
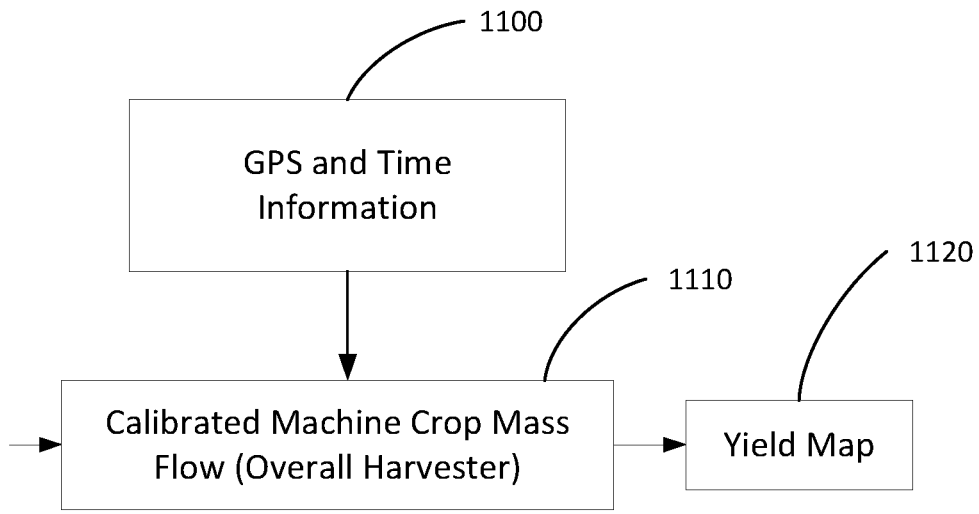
FIGS. 11a and 11b are functional flow diagrams showing production of yield maps by application of selected data to crop yield data developed using the managed calibration factor in accordance with an example implementation.
Figure 11B:
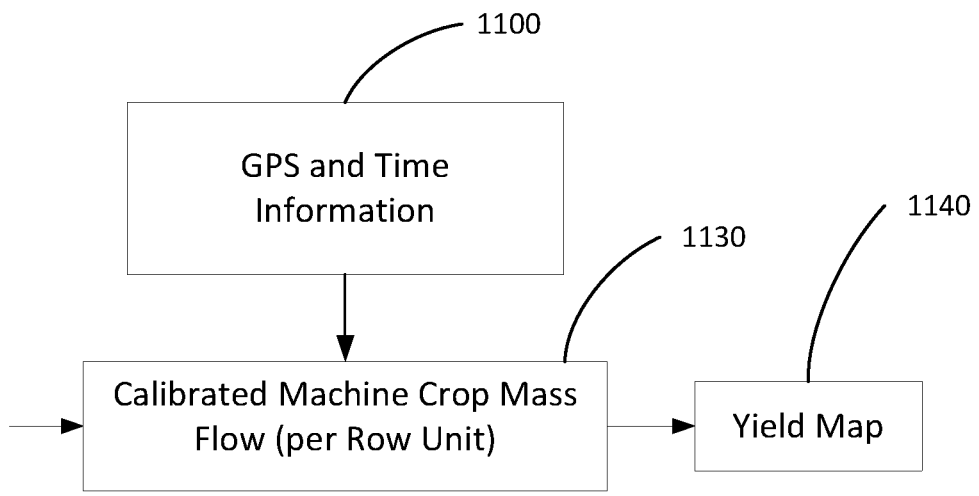

With reference next to FIG. 9, the same calibration factor CF can be applied as necessary and/or desired to an individual row unit relative or non-calibrated mass flow rate based on the principles of the distributive property.

$$\dot{m}_{machinecalibrated} = CF * \dot{m}_{machinerelative} = CF * \sum_{i=0}^{n} \dot{m}_i = \sum_{i=0}^{n} CF * \dot{m}_i \qquad \text{Equation 9}$$

where:
 $\dot{m}_{machinecalibrated}$=mass flow rate machine calibrated
 $\dot{m}_{machinerelative}$=mass flow rate machine noncalibrated
 CF=calibration factor
 $\dot{m}_i$=mass flow rate for sensor i
 n=total number for sensors Therefore the calibration factor CF calculated on the machine mass flow rate can be applied 902 to individual row unit mass flow rates at 910 as:

$$\dot{m}_{rowunitcalibrated} = CF * \dot{m}_{rowunitrelative} \qquad \text{Equation 10}$$

where:
 $\dot{m}_{rowunitcalibrated}$=mass flow rate row unit calibrated
 $\dot{m}_{rowunitrelative}$=mass flow rate row unit noncalibrated
 CF=calibration factor Therefore the calibration factor CF calculated on the machine mass flow rate can be applied 904 to the collective of all of the row unit mass flow rates at 920 as:

$$\dot{m}_{tcalibrated} = CF * \dot{m}_{relative} \qquad \text{Equation 11}$$

where:

$\dot{m}_{rowunitcalibrated}$=mass flow rate row unit calibrated
$\dot{m}_{rowunitrelative}$=mass flow rate row unit noncalibrated
CF=calibration factor With reference to FIG. 10a, machine wet mass yield can be calculated as an application 1012 of the machine mass flow rate, header width, and vehicle speed at 1010 as:

$$CY_{machine} = \frac{\dot{m}_{machinecalibrated}}{W_{header} * v} \quad \text{Equation 12}$$

where:

$CY_{machine}$=crop wet mass yield machine
$\dot{m}_{machinecalibrated}$=mass flow rate machine calibrated
$W_{header}$=header width
v=vehicle speed Machine wet mass yield can be converted to a dry or standardized basis to reduce the effect of moisture on actual yield as an application 1022 at 1020 as:

$$CY_{machine\_standardized} = CY_{wetbasis} * \frac{(100-MC)}{(100-MC_{DB})} \quad \text{Equation 13}$$

where:

$CY_{standardized}$=standardized crop mass yield
$CY_{wetbasis}$=wet crop mass yield
MC=moisture content
$MC_{DB}$=dry basis moisture content Machine lint yield can be calculated as a function of the standardized crop mass yield and turnout as an application 1032 at 1030 as:

$$LY_{machine} = CY_{standardized} * GT \quad \text{Equation 14}$$

where:

LY=lint yield
$CY_{standardized}$=standardized crop mass yield
GT=gin turnout as a percentage and/or fraction With reference to FIG. 10b, row unit wet mass yield can be calculated as an application 1042 of the row unit mass flow rate, row unit width, and vehicle speed at 1040 as:

$$CY_{rowunit} = \frac{\dot{m}_{rowunitcalibrated}}{W_{rowunit} * v} \quad \text{Equation 15}$$

where:

$CY_{rowunit}$=crop wet mass yield row unit
$\dot{m}_{rowunitcalibrated}$=mass flow rate row unit calibrated
$W_{rowunit}$=row unit width
v=vehicle speed Wet mass yield on a per row basis can be converted to a dry or standardized basis to reduce the effect of moisture on actual yield as an application 1052 at 1050 as:

$$CY_{row\_unit\_standardized} = CY_{wetbasis} * \frac{(100-MC)}{(100-MC_{DB})} \quad \text{Equation 16}$$

where:

$CY_{standardized}$=standardized crop mass yield
$CY_{wetbasis}$=wet crop mass yield
MC=moisture content
$MC_{DB}$=dry basis moisture content Lint yield can be calculated on a per row basis as a function of the standardized crop mass yield and turnout by application 1062 at 1060 as:

$$LY_{row\_unit} = CY_{standardized} * GT \quad \text{Equation 17}$$

where:

LY=lint yield
$CY_{standardized}$=standardized crop mass yield
GT=gin turnout as a percentage and/or fraction With reference now to FIGS. 11a and 11b, the example implementations described herein are used to generate highly accurate yield maps. With reference first to FIG. 11a, Global Positioning System (GPS) data and/or time information and/or data 1100 is received such as for example by retrieving the GPS and/or time information 1100 from the memory device 314 and applied 1110 to the calibrated yield information $M_{machine\_calibrated}$ to render yield map data 1120. The GPS data and/or time information and/or data 1100 may also be received such as for example by receiving the data from a network of the cotton harvester 15 such as for example a CAN and applied 1110 to the calibrated yield information $M_{machine\_calibrated}$ to render the yield map data 1120. The yield map data 1120 is rendered in real time and may be stored in the memory device 314 and/or transmitted to other devices of the harvester 15 using the CAN and/or transmitted to a remote apparatus, vehicle, system or the like via a wired and/or wireless communication network of the cotton harvester 15.

With reference next to FIG. 11b, the GPS data and/or time information and/or data 1100 received such as for example by retrieving the GPS and/or time information 1100 from the memory device 314 may be applied 1130 to the calibrated yield information $M_{row\_unit\_calibrated}$ to render yield map data 1140 on a per row unit basis. The GPS data and/or time information and/or data 1100 may also be received such as for example by receiving the data from a network of the cotton harvester 15 such as for example a CAN and applied 1130 to the calibrated per row unit yield information $M_{row\_unit\_calibrated}$ to render the row unit basis yield map data 1140. The yield map data 1140 is rendered in real time and may be stored in the memory device 314 and/or transmitted to other devices of the harvester 15 using the CAN and/or transmitted to a remote apparatus, vehicle, system or the like via a wired and/or wireless communication network of the cotton harvester 15.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative implementation(s) have been shown and described and that all changes and modifications that come within the spirit of the present disclosure are desired to be protected. Alternative implementations of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A cotton harvester comprising:
a chassis supported for movement relative to ground beneath the cotton harvester by ground engaging members operatively coupled with the chassis;
a cotton harvesting head operatively coupled with the chassis and comprising a plurality of cotton picking row units operable to harvest cotton from plants entering into the cotton harvesting head as the cotton harvester is moved forward relative to the ground by the ground engaging members;
a crop receptacle operatively coupled with the chassis, the crop receptacle comprising a module builder configured to form the harvested cotton into a cotton module;
an air duct system comprising a plurality of separate air ducts, wherein each of the separate air ducts is associated with one of the cotton picking row units for communicating the cotton harvested from the cotton picking row units to the crop receptacle; and
an apparatus for determining a yield of the cotton harvested comprising:
a harvesting sensor operative to generate a production signal representative of a production rate of the cotton being harvested;
an accumulated crop sensor operative to generate a bulk crop signal representative of a measured parameter of the cotton harvested during a selected time period; and
a crop sensing control system comprising:
a processor;
a memory device operably coupled with the processor;
operational data stored in the memory device, the operational data comprising harvester data representative of an operational characteristic of the cotton harvester;
base calibration factor data stored in the memory device, the base calibration data being representative of a base calibration factor; and
control logic stored in the memory device and executable by the processor to determine the yield of the cotton harvested,
wherein the control logic is executable by the processor to:
receive the production signal;
receive the bulk crop signal;
determine in response to applying the base calibration factor to the production signal an estimated mass of the cotton harvested during a first time period;
determine in response to the bulk crop signal a measured mass of the cotton harvested during the first time period;
determine an updated calibration factor candidate in response to a ratio between the estimated mass and the measured module mass; and
determine a yield of the cotton harvested during a second time period after the first time period by selectively applying, in response to the operational data, one of either the base calibration factor or the updated calibration factor candidate to the production signal generated by the harvesting sensor during the second time period representative of the production rate of the cotton harvested during the second time period,
wherein the accumulated crop sensor comprises a module diameter feedback device operative to generate a cotton module diameter signal representative of a measured diameter of the cotton module formed by the module builder using the cotton harvested during the first time period and bundled into the cotton module,
wherein the control logic is executable by the processor to determine in response to the cotton module diameter signal a cotton module diameter of the cotton module,
wherein the operational data comprises harvester data comprising cotton bundle required diameter data representative of a minimum required diameter of the cotton module,
wherein the control logic comprises calibration management logic executable by the processor to determine the yield of cotton harvested during the second time period by:
applying the updated calibration factor candidate to the production signal generated by the harvesting sensor during the second time period in response to the determined cotton module diameter being greater than the minimum required diameter, or
applying the base calibration factor to the production signal generated by the harvesting sensor during the second time period in response to the determined cotton module diameter being less than the minimum required diameter.

2. A cotton harvester comprising:
a chassis supported for movement relative to ground beneath the cotton harvester by ground engaging members operatively coupled with the chassis;
a cotton harvesting head operatively coupled with the chassis and comprising a plurality of cotton picking row units operable to harvest cotton from plants entering into the cotton harvesting head as the cotton harvester is moved forward relative to the ground by the ground engaging members;
a crop receptacle operatively coupled with the chassis, the crop receptacle comprising a module builder configured to form the harvested cotton into a cotton module;
an air duct system comprising a plurality of separate air ducts, wherein each of the separate air ducts is associated with one of the cotton picking row units for communicating the cotton harvested from the cotton picking row units to the crop receptacle; and
an apparatus for determining a yield of the cotton harvested comprising:
a harvesting sensor operative to generate a production signal representative of a production rate of the cotton being harvested;
an accumulated crop sensor operative to generate a bulk crop signal representative of a measured parameter of the cotton harvested during a selected time period; and
a crop sensing control system comprising:
a processor;
a memory device operably coupled with the processor;
operational data stored in the memory device, the operational data comprising harvester data representative of an operational characteristic of the cotton harvester;
base calibration factor data stored in the memory device, the base calibration data being representative of a base calibration factor; and
control logic stored in the memory device and executable by the processor to determine the yield of the cotton harvested, wherein the control logic is executable by the processor to:
  receive the production signal;
  receive the bulk crop signal;
  determine in response to applying the base calibration factor to the production signal an estimated mass of the cotton harvested during a first time period;
  determine in response to the bulk crop signal a measured mass of the cotton harvested during the first time period;
  determine an updated calibration factor candidate in response to a ratio between the estimated mass and the measured module mass; and
  determine a yield of the cotton harvested during a second time period after the first time period by selectively applying, in response to the operational data, one of either the base calibration factor or the updated calibration factor candidate to the production signal generated by the harvesting sensor during the second time period representative of the production rate of the cotton harvested during the second time period,
wherein the crop receptacle comprises an accumulator operatively coupled with the chassis and disposed between the air duct system and the module builder, the accumulator being operable to receive the cotton harvested by the cotton harvesting head and to selectively deliver the received cotton to the module builder,
wherein each of the separate air ducts of the air duct system communicates the cotton harvested from the cotton picking row units to the crop receptacle via the accumulator,
wherein the accumulated crop sensor comprises an accumulator level feedback device operative to generate an accumulator level signal representative of a measured level of the cotton harvested during the first time period and received in the accumulator,
wherein the control logic is executable by the processor to determine in response to the accumulator level signal a cotton fill level of the of the cotton harvested during the first time period and received in the accumulator,
wherein the operational data comprises harvester data comprising accumulator required cotton fill level data representative of a minimum required pile height of the cotton harvested during the first time period and stacked in the accumulator,
wherein the control logic comprises calibration management logic executable by the processor to determine the yield of the cotton harvested during the second time period by:
  applying the updated calibration factor candidate to the production signal generated by the harvesting sensor during the second time period in response to the determined cotton fill level of the cotton harvested during the first time period and received in the accumulator being greater than the minimum required pile height, or
  applying the base calibration factor to the production signal generated by the harvesting sensor during the second time period in response to the determined cotton fill level of the cotton harvested during the first time period and received in the accumulator being less than the minimum required pile height.

3. A cotton harvester comprising:
a chassis supported for movement relative to ground beneath the cotton harvester by ground engaging members operatively coupled with the chassis;
a cotton harvesting head operatively coupled with the chassis and comprising a plurality of cotton picking row units operable to harvest cotton from plants entering into the cotton harvesting head as the cotton harvester is moved forward relative to the ground by the ground engaging members;
a crop receptacle operatively coupled with the chassis, the crop receptacle comprising a module builder configured to form the harvested cotton into a cotton module;
an air duct system comprising a plurality of separate air ducts, wherein each of the separate air ducts is associated with one of the cotton picking row units for communicating the cotton harvested from the cotton picking row units to the crop receptacle; and
an apparatus for determining a yield of the cotton harvested comprising:
  a harvesting sensor operative to generate a production signal representative of a production rate of the cotton being harvested;
  an accumulated crop sensor operative to generate a bulk crop signal representative of a measured parameter of the cotton harvested during a selected time period; and
  a crop sensing control system comprising:
    a processor;
    a memory device operably coupled with the processor;
    operational data stored in the memory device, the operational data comprising harvester data representative of an operational characteristic of the cotton harvester;
    base calibration factor data stored in the memory device, the base calibration data being representative of a base calibration factor; and
    control logic stored in the memory device and executable by the processor to determine the yield of the cotton harvested,
wherein the control logic is executable by the processor to:
  receive the production signal;
  receive the bulk crop signal;
  determine in response to applying the base calibration factor to the production signal an estimated mass of the cotton harvested during a first time period;
  determine in response to the bulk crop signal a measured mass of the cotton harvested during the first time period;
  determine an updated calibration factor candidate in response to a ratio between the estimated mass and the measured module mass; and
determine a yield of the cotton harvested during a second time period after the first time period by selectively applying, in response to the operational data, one of either the base calibration factor or the updated calibration factor candidate to the production signal generated by the harvesting sensor during the second time period representative of the production rate of the cotton harvested during the second time period,
wherein the memory device is operable to store a plurality of historical ratios between the estimated mass and the measured mass determined during a plurality of time periods prior to the first time period,
wherein the control logic comprises statistical control logic executable by the processor to determine a ratio standard deviation value based on the stored plurality of historical ratios between the estimated mass and the measured mass determined during the plurality of time periods prior to the first time period, wherein the statistical control logic is executable by the processor to determine a required ratio range in response to the determined ratio standard deviation value.

4. The cotton harvester according to claim 3, wherein:

the accumulated crop sensor comprises a module mass feedback device operative to generate a bulk cotton module mass signal representative of a measured mass of the cotton harvested during the first time period and bundled into the cotton module;

the control logic is executable by the processor to determine in response to the bulk cotton module mass signal a bulk cotton module mass of the cotton harvested during the first time period;

the operational data comprises harvester data comprising cotton bundle required mass data representative of a required mass range of the cotton module; and the control logic comprises calibration management logic executable by the processor to determine the yield of cotton harvested during the second time period by:

applying the updated calibration factor candidate to the production signal generated by the harvesting sensor during the second time period in response to the determined bulk cotton module mass of the cotton harvested during the first time period being within the required mass range of the cotton module, or applying the base calibration factor to the production signal generated by the harvesting sensor during the second time period in response to the determined bulk cotton module mass of the cotton harvested during the first time period being not within the required mass range of the cotton module.

5. The cotton harvester according to claim 3, wherein:

the operational data stored in the memory device comprises harvester data comprising ratio range data representative of the required ratio range; and the control logic comprises calibration management logic executable by the processor to determine the yield of the cotton during the second time period by:

applying the updated calibration factor candidate to the production signal generated by the harvesting sensor during the second time period in response to the ratio between the estimated mass of the cotton harvested during the first time period and the measured mass of the cotton harvested during the first time period being within the required ratio range, or applying the base calibration factor to the production signal generated by the harvesting sensor during the second time period in response to the ratio between the estimated mass of the cotton harvested during the first time period and the measured mass of the cotton harvested during the first time period being not within the required ratio range.

6. The cotton harvester according to claim 3, wherein:

the harvesting sensor comprises a plurality of mass flow sensors operatively coupled with the plurality of separate air ducts, wherein each of the mass flow sensors is operable to generate a cotton mass flow rate signal representative of a mass flow rate of cotton harvested and flowing through a respective one of the separate air ducts; and the control logic is executable by the processor to normalize the cotton mass flow rate signals generated by the plurality of mass flow sensors as normalized cotton mass flow rate signals, and to sum the normalized cotton mass flow rate signals as the production signal representative of the production rate of the cotton being harvested.

7. A method for determining crop yield during harvesting of the crop, the method comprising:

storing operational data in a memory device of a crop sensing control system comprising a processor and the memory device operably coupled with the processor, the operational data comprising harvester data representative of an operational characteristic of an associated harvester harvesting the crop;

storing base calibration factor data in the memory device, the base calibration data being representative of a base calibration factor;

storing control logic in the memory device, wherein the control logic is executable by the processor to determine the crop yield;

generating by a harvesting sensor operably coupled with the crop sensing control system a production signal representative of a production rate of the crop being harvested;

generating by an accumulated crop sensor operably coupled with the crop sensing control system a bulk crop signal representative of a measured parameter of the crop harvested during a selected time period; and executing the control logic by the processor to:

determine in response to applying the base calibration factor to the production signal an estimated mass of the crop harvested during a first time period;

determine in response to the bulk crop signal a measured mass of the crop harvested during the first time period;

determine an updated calibration factor candidate in response to a ratio between the estimated mass and the measured mass; and determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period, wherein the generating the bulk crop signal comprises generating by a module diameter feedback device a crop module diameter signal representative of a measured diameter of a crop module a formed by the associated harvester using the crop harvested during the first time period and bundled into the crop module;

wherein the executing the control logic by the processor comprises executing the control logic by the processor to determine in response to the crop module diameter signal a crop module diameter of the crop module;

wherein the storing the harvester data in the memory device comprises storing in the memory device crop bundle required diameter data representative of a minimum required diameter of the crop module, wherein the executing the control logic by the processor comprises executing calibration management logic by the processor to determine the crop yield during the second time period by:

applying the updated calibration factor candidate to the production signal generated by the harvesting sensor during the second time period in response to the determined crop module diameter being greater than the minimum required diameter, or applying the base calibration factor to the production signal generated by the harvesting sensor during the second time period in response to the determined crop module diameter being less than the minimum required diameter.

8. A method for determining crop yield during harvesting of the crop, the method comprising:

storing operational data in a memory device of a crop sensing control system comprising a processor and the memory device operably coupled with the processor, the operational data comprising harvester data representative of an operational characteristic of an associated harvester harvesting the crop;

storing base calibration factor data in the memory device, the base calibration data being representative of a base calibration factor;

storing control logic in the memory device, wherein the control logic is executable by the processor to determine the crop yield;

generating by a harvesting sensor operably coupled with the crop sensing control system a production signal representative of a production rate of the crop being harvested;

generating by an accumulated crop sensor operably coupled with the crop sensing control system a bulk crop signal representative of a measured parameter of the crop harvested during a selected time period; and executing the control logic by the processor to:
determine in response to applying the base calibration factor to the production signal an estimated mass of the crop harvested during a first time period;
determine in response to the bulk crop signal a measured mass of the crop harvested during the first time period;
determine an updated calibration factor candidate in response to a ratio between the estimated mass and the measured mass; and
determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period, wherein the generating the bulk crop signal comprises generating by an accumulator level feedback device an accumulator level signal representative of a measured level of the crop harvested during the first time period and received in an accumulator of the associated harvester;

wherein the executing the control logic by the processor comprises executing the control logic by the processor to determine in response to the accumulator level signal a crop fill level of the of the crop harvested during the first time period and received in the accumulator of the associated harvester;

wherein the storing the harvester data in the memory device comprises storing in the memory device accumulator required crop fill level data representative of a minimum required pile height of the crop harvested during the first time period and stacked in the accumulator of the associated harvester, wherein the executing the control logic by the processor comprises executing calibration management logic by the processor to determine the crop yield during the second time period by:

applying the updated calibration factor candidate to the production signal generated by the harvesting sensor during the second time period in response to the determined crop fill level of the crop harvested during the first time period and received in the accumulator of the associated harvester being greater than the minimum required pile height, or applying the base calibration factor to the production signal generated by the harvesting sensor during the second time period in response to the determined crop fill level of the crop harvested during the first time period and received in the accumulator of the associated harvester being less than the minimum required pile height.

9. A method for determining crop yield during harvesting of the crop, the method comprising:

storing operational data in a memory device of a crop sensing control system comprising a processor and the memory device operably coupled with the processor, the operational data comprising harvester data representative of an operational characteristic of an associated harvester harvesting the crop;

storing base calibration factor data in the memory device, the base calibration data being representative of a base calibration factor;

storing control logic in the memory device, wherein the control logic is executable by the processor to determine the crop yield;

generating by a harvesting sensor operably coupled with the crop sensing control system a production signal representative of a production rate of the crop being harvested;

generating by an accumulated crop sensor operably coupled with the crop sensing control system a bulk crop signal representative of a measured parameter of the crop harvested during a selected time period; and executing the control logic by the processor to:
determine in response to applying the base calibration factor to the production signal an estimated mass of the crop harvested during a first time period;
determine in response to the bulk crop signal a measured mass of the crop harvested during the first time period;
determine an updated calibration factor candidate in response to a ratio between the estimated mass and the measured mass; and
determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period, wherein the storing the operational data in the memory device comprises storing a plurality of historical ratios between the estimated mass and the measured mass determined during a plurality of time periods prior to the first time period, wherein the storing the control logic in the memory device comprises storing statistical control logic executable by the processor to determine a ratio standard deviation value based on the stored plurality of historical ratios between the estimated mass and the measured mass determined during the plurality of time periods prior to the first time period, wherein the executing the control logic by the processor comprises executing the statistical control logic by the processor to determine a required ratio range based on the determined ratio standard deviation value.

10. The method according to claim 9, wherein:
the generating the production signal representative of the production rate of the crop being harvested comprises generating by a module mass feedback device a bulk crop module mass signal representative of a measured mass of the crop harvested during the first time period and bundled into a crop module;
the executing the control logic by the processor comprises executing the control logic by the processor to determine in response to the bulk crop module mass signal a bulk crop module mass of the crop harvested during the first time period;
the storing the harvester data in the memory device comprises storing in the memory device crop bundle required mass data representative of a required mass range of the crop module; and
the executing the control logic by the processor comprises executing calibration management logic by the processor to determine the crop yield during the second time period by:
applying the updated calibration factor candidate to the production signal generated by the harvesting sensor during the second time period in response to the determined bulk crop module mass of the crop harvested during the first time period being within the required mass range of the crop module, or
applying the base calibration factor to the production signal generated by the harvesting sensor during the second time period in response to the determined bulk crop module mass of the crop harvested during the first time period being not within the required mass range of the crop module.

11. The method according to claim 9, wherein:
the storing the operational data in the memory device comprises storing ratio range data representative of the required ratio range of the ratio between the estimated mass of the crop harvested during the first time period and the measured mass of the crop harvested during the first time period; and
the executing the control logic comprises executing calibration management logic by the processor to determine the crop yield during the second time period by:
applying the updated calibration factor candidate to the production signal generated by the harvesting sensor during the second time period in response to the ratio between the estimated mass of the crop harvested during the first time period and the measured mass of the crop harvested during the first time period being within the required ratio range, or
applying the base calibration factor to the production signal generated by the harvesting sensor during the second time period in response to the ratio between the estimated mass of the crop harvested during the first time period and the measured mass of the crop harvested during the first time period being not within the required ratio range.

12. The method according to claim 9, wherein:
the generating the production signal comprises generating the production signal using a plurality of mass flow sensors operatively coupled with a plurality of separate air ducts of the associated harvester, wherein each of the mass flow sensors is operable to generate a cotton mass flow rate signal representative of a mass flow rate of cotton harvested and flowing through a respective one of the separate air ducts of the associated harvester; and
the executing the control logic comprises executing the control logic by the processor to normalize the cotton mass flow rate signals generated by the plurality of mass flow sensors as normalized cotton mass flow rate signals, and to sum the normalized cotton mass flow rate signals as the production signal representative of the production rate of the cotton being harvested.

13. An apparatus for determining crop yield during harvesting of the crop comprising:
a harvesting sensor operable to generate a production signal representative of a production rate of the crop being harvested;
an accumulated crop sensor operable to generate a bulk crop signal representative of a measured parameter of the crop harvested during a selected time period; and
a crop sensing control system operably coupled with the harvesting and accumulated crop sensors, the crop sensing control system comprising:
a processor;
a memory device operably coupled with the processor;
operational data stored in the memory device, the operational data comprising harvester data representative of an operational characteristic of an associated harvester harvesting the crop;
base calibration factor data stored in the memory device, the base calibration data being representative of a base calibration factor; and
control logic stored in the memory device and executable by the processor to determine the crop yield;
wherein the control logic is executable by the processor to:
receive the production signal;
receive the bulk crop signal;
determine in response to applying the base calibration factor to the production signal an estimated mass of the crop harvested during a first time period;
determine in response to the bulk crop signal a measured mass of the crop harvested during the first time period;
determine an updated calibration factor candidate in response to a ratio between the estimated mass and the measured mass; and
determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period,
wherein the accumulated crop sensor comprises a module diameter feedback device operative to generate a crop module diameter signal representative of a measured diameter of a crop module formed by the associated harvester using the crop harvested during the first time period and bundled into the crop module,
wherein the control logic is executable by the processor to determine in response to the crop module diameter signal a crop module diameter of the crop module,
wherein the harvester data comprises crop bundle required diameter data representative of a minimum required diameter of the crop module, wherein the control logic comprises calibration management logic executable by the processor to determine the crop yield during the second time period by:
applying the updated calibration factor candidate to the production signal generated by the harvesting sensor during the second time period in response to the determined crop module diameter being greater than the minimum required diameter, or
applying the base calibration factor to the production signal generated by the harvesting sensor during the second time period in response to the determined crop module diameter being less than the minimum required diameter.

14. An apparatus for determining crop yield during harvesting of the crop comprising:
a harvesting sensor operable to generate a production signal representative of a production rate of the crop being harvested;
an accumulated crop sensor operable to generate a bulk crop signal representative of a measured parameter of the crop harvested during a selected time period; and
a crop sensing control system operably coupled with the harvesting and accumulated crop sensors, the crop sensing control system comprising:
a processor;
a memory device operably coupled with the processor;
operational data stored in the memory device, the operational data comprising harvester data representative of an operational characteristic of an associated harvester harvesting the crop;
base calibration factor data stored in the memory device, the base calibration data being representative of a base calibration factor; and
control logic stored in the memory device and executable by the processor to determine the crop yield;
wherein the control logic is executable by the processor to:
receive the production signal;
receive the bulk crop signal;
determine in response to applying the base calibration factor to the production signal an estimated mass of the crop harvested during a first time period;
determine in response to the bulk crop signal a measured mass of the crop harvested during the first time period;
determine an updated calibration factor candidate in response to a ratio between the estimated mass and the measured mass; and
determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period,
wherein the accumulated crop sensor comprises an accumulator level feedback device operative to generate an accumulator level signal representative of a measured level of the crop harvested during the first time period and received in an accumulator of the associated harvester
wherein the control logic is executable by the processor to determine in response to the accumulator level signal a crop fill level of the of the crop harvested during the first time period and received in the accumulator of the associated harvester,
wherein the harvester data comprises accumulator required crop fill level data representative of a minimum required pile height of the crop harvested during the first time period and stacked in the accumulator of the associated harvester,
wherein the control logic comprises calibration management logic executable by the processor to determine the crop yield during the second time period by:
applying the updated calibration factor candidate to the production signal generated by the harvesting sensor during the second time period in response to the determined crop fill level of the crop harvested during the first time period and received in the accumulator of the associated harvester being greater than the minimum required pile height, or
applying the base calibration factor to the production signal generated by the harvesting sensor during the second time period in response to the determined crop fill level of the crop harvested during the first time period and received in the accumulator of the associated harvester being less than the minimum required pile height.

15. An apparatus for determining crop yield during harvesting of the crop comprising:
a harvesting sensor operable to generate a production signal representative of a production rate of the crop being harvested;
an accumulated crop sensor operable to generate a bulk crop signal representative of a measured parameter of the crop harvested during a selected time period; and
a crop sensing control system operably coupled with the harvesting and accumulated crop sensors, the crop sensing control system comprising:
a processor;
a memory device operably coupled with the processor;
operational data stored in the memory device, the operational data comprising harvester data representative of an operational characteristic of an associated harvester harvesting the crop;
base calibration factor data stored in the memory device, the base calibration data being representative of a base calibration factor; and
control logic stored in the memory device and executable by the processor to determine the crop yield;
wherein the control logic is executable by the processor to:
receive the production signal;
receive the bulk crop signal;
determine in response to applying the base calibration factor to the production signal an estimated mass of the crop harvested during a first time period;
determine in response to the bulk crop signal a measured mass of the crop harvested during the first time period;
determine an updated calibration factor candidate in response to a ratio between the estimated mass and the measured mass; and
determine the crop yield during a second time period after the first time period by selectively applying, in response to the operational data, one of either the base calibration factor or the updated calibration factor candidate to the production signal generated by the harvesting sensor during the second time period representative of the production rate of the crop harvested during the second time period,
wherein the memory device is operable to store a plurality of historical ratios between the estimated mass and the measured mass determined during a plurality of time periods prior to the first time period, wherein the control logic comprises statistical control logic executable by the processor to determine a ratio standard deviation value based on the stored plurality of historical ratios between the estimated mass and the measured mass determined during the plurality of time periods prior to the first time period, wherein the statistical control logic is executable by the processor to determine a required ratio range based on the determined ratio standard deviation value.

16. The apparatus according to claim 15, wherein:

the accumulated crop sensor comprises a module mass feedback device operative to generate a bulk crop module mass signal representative of a measured mass of the crop harvested during the first time period and bundled into a crop module;

the control logic is executable by the processor to determine in response to the bulk crop module mass signal a bulk crop module mass of the crop harvested during the first time period;

the harvester data comprises crop bundle required mass data representative of a required mass range of the crop module; and the control logic comprises calibration management logic executable by the processor to determine the crop yield during the second time period by:

applying the updated calibration factor candidate to the production signal generated by the harvesting sensor during the second time period in response to the determined bulk crop module mass of the crop harvested during the first time period being within the required mass range of the crop module, or applying the base calibration factor to the production signal generated by the harvesting sensor during the second time period in response to the determined bulk crop module mass of the crop harvested during the first time period being not within the required mass range of the crop module.

17. The apparatus according to claim 15, wherein:

the operational data stored in the memory device comprises ratio range data representative of the required ratio range of the ratio between the estimated mass of the crop harvested during the first time period and the measured mass of the crop harvested during the first time period; and the control logic comprises calibration management logic executable by the processor to determine the crop yield during the second time period by:

applying the updated calibration factor candidate to the production signal generated by the harvesting sensor during the second time period in response to the ratio between the estimated mass of the crop harvested during the first time period and the measured mass of the crop harvested during the first time period being within the required ratio range, or applying the base calibration factor to the production signal generated by the harvesting sensor during the second time period in response to the ratio between the estimated mass of the crop harvested during the first time period and the measured mass of the crop harvested during the first time period being not within the required ratio range.

18. The apparatus according to claim 15, wherein:

the harvesting sensor comprises a plurality of mass flow sensors operatively coupled with a plurality of separate air ducts of the associated harvester, wherein each of the mass flow sensors is operable to generate a cotton mass flow rate signal representative of a mass flow rate of cotton harvested and flowing through a respective one of the separate air ducts of the associated harvester; and the control logic is executable by the processor to normalize the cotton mass flow rate signals generated by the plurality of mass flow sensors as normalized cotton mass flow rate signals, and to sum the normalized cotton mass flow rate signals as the production signal representative of the production rate of the cotton being harvested.

\* \* \* \* \*